US012408583B2

(12) United States Patent
Guo

(10) Patent No.: US 12,408,583 B2
(45) Date of Patent: *Sep. 9, 2025

(54) STRING TRIMMER AND TRIMMING HEAD THEREOF

(71) Applicant: Nanjing Chervon Industry Co., Ltd., Nanjing (CN)

(72) Inventor: Jianpeng Guo, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 386 days.

This patent is subject to a terminal disclaimer.

(21) Appl. No.: 17/551,282

(22) Filed: Dec. 15, 2021

(65) Prior Publication Data

US 2022/0104431 A1 Apr. 7, 2022

Related U.S. Application Data

(63) Continuation of application No. PCT/CN2020/096353, filed on Jun. 16, 2020.

(30) Foreign Application Priority Data

Jun. 17, 2019 (CN) .......................... 201910520911.X

(51) Int. Cl.
*A01D 34/416* (2006.01)
*A01D 101/00* (2006.01)

(52) U.S. Cl.
CPC ..... *A01D 34/4162* (2013.01); *A01D 34/4166* (2013.01); *A01D 2101/00* (2013.01)

(58) Field of Classification Search
CPC ............ A01D 34/4162; A01D 34/4166; A01D 34/00; A01D 34/4161; A01D 34/416;
(Continued)

(56) References Cited

U.S. PATENT DOCUMENTS 4,419,822 A 12/1983 Harris
4,888,871 A * 12/1989 Engelbrecht ....... A01D 34/4162
30/276
(Continued)

FOREIGN PATENT DOCUMENTS

CN 105815028 A 8/2016
CN 109379973 A 12/2017
(Continued)

OTHER PUBLICATIONS

ISA/CN, International Search Report issued on PCT application No. PCT/CN2020/096353, dated Sep. 21, 2020, 4 pages.
(Continued)

*Primary Examiner* — Adam J Eiseman
*Assistant Examiner* — Robert D Cornett
(74) *Attorney, Agent, or Firm* — Greenberg Traurig, LLP

(57) ABSTRACT

A string trimmer includes a trimming head, a driving device, and an operating device. The trimming head includes a spool, a head housing formed with an accommodating space, and a transmission member mounted to the spool that can move freely between the head housing and the spool in the direction of a straight line perpendicular to the direction of the rotation axis. The trimming line has an effective portion extending from the accommodating space. When the length of the effective portion of the trimming line is larger than a preset value, the transmission member automatically releases the head housing. When the length of the effective portion of the trimming line is less than the preset value, the transmission member locks the head housing.

16 Claims, 13 Drawing Sheets

(58) Field of Classification Search
CPC ............ A01D 34/4163; A01D 34/4165; A01D 34/4167; A01D 34/4168; A01D 69/06; A01D 75/20
USPC .......................................................... 30/276
See application file for complete search history.

(56) References Cited

U.S. PATENT DOCUMENTS

| | | | |
|---|---|---|---|
| 7,797,839 | B2 | 9/2010 | Proulx |
| 2009/0260237 | A1 | 10/2009 | Alliss |
| 2016/0183452 | A1 | 6/2016 | Kullberg |
| 2016/0249529 | A1* | 9/2016 | Ma ..................... A01D 34/4161 30/276 |
| 2017/0347523 | A1 | 12/2017 | Alliss |
| 2018/0098492 | A1 | 4/2018 | Guo |
| 2020/0128728 | A1 | 4/2020 | Guo |
| 2021/0378173 | A1 | 12/2021 | Cholst |
| 2022/0104430 | A1 | 4/2022 | Guo |
| 2023/0397527 | A1 | 12/2023 | Guo |

FOREIGN PATENT DOCUMENTS

| | | | |
|---|---|---|---|
| CN | 108135129 | A | 6/2018 |
| CN | 109691287 | A | 4/2019 |
| CN | 111096141 | A | 4/2023 |
| EP | 2798934 | A1 | 11/2014 |
| WO | 2016173657 | A1 | 11/2016 |

OTHER PUBLICATIONS

ISA/CN, English translation of International Search Report issued on PCT application No. PCT/CN2020/096353, dated Sep. 21, 2020, 2 pages.
EPO, extended European search report issued on European patent application No. 20826472.1, dated Jun. 20, 2022, 7 pages.
CIPO, office action issued on Canadian patent application No. 3,144,111, dated Mar. 15, 2023, 17 pages.
Office Action from Canadian application No. 3,144,111, dated Mar. 20, 2024, 8 pp.
Non-final Office Action from U.S. Appl. No. 17/551,225, dated Mar. 26, 2025, 14 pp.
International Search Report and Written Opinion of application No. PCT/CN20/96353, dated Sep. 21, 2020, 6 pp.
Written Opinion of international application No. PCT/CN20/96354, dated Dec. 21, 2017, 4 pp.

* cited by examiner

STRING TRIMMER AND TRIMMING HEAD THEREOF

RELATED APPLICATION INFORMATION

This application is a continuation of International Application Number PCT/CN2020/096353, filed on Jun. 16, 2020, through which this application also claims the benefit under 35 U.S.C. § 119(a) of Chinese Patent Application No. CN 201910520911.X, filed on Jun. 17, 2019, which applications are incorporated herein by reference in their entirety.

TECHNICAL FIELD

The present disclosure relates to a garden tool, for example, a string trimmer and a trimming head thereof.

BACKGROUND

As a garden tool, a string trimmer can be used for trimming grass in lawn of villas and gardens. At present, the string trimmer on the market mainly use tapping or a switch to control a spool and a head housing of the trimming head to produce a speed difference to feed a line. Currently users cannot accurately feed the length of the line according to actual needs. In fact, none of the known trimming heads can realize automatic feed in the true sense.

Generally speaking, the trimming head with an automatic feeding function causes a trimming line to be released by causing a relative rotation between the head housing and the spool. There are many ways to make the head housing and the spool rotate relative to each other. In the related art, the automatic feeding of the string trimmer generally requires the outside to input an instruction signal to the trimming head, and the string trimmer must be controlled to feed the trimming line according to the human judgment of an operator. That is, when the operator observes that the length of the trimming line changes and the trimming efficiency is reduced, the string trimmer is manually controlled to feed. This includes the control of the string trimmer to accelerate or decelerate through the feeding switch for the speed difference between the head housing and the spool, or through tapping the trimming head to cause the speed difference between the head housing and the spool to achieve a line-feeding. For this type of string trimmer, when the line is automatically feeding, the trimming head will produce a large speed difference when it is driven, and generally will produce a speed difference of more than 30%, so as to achieve a speed difference between the head housing and the spool. As for some string trimmer with automatic feeding function in related technologies, they are set so that when the string trimmer is turned on or off, there will also be a speed difference between the head housing and the spool to achieve line feeding, which is not effective and reliable line feeding based on actual needs. Under the premise that the trimming line itself has an effective cutting length, this kind of line feeding requires the user to cut off the excess line, which actually causes a certain degree of waste of resources, and it will cause some unnecessary troubles to the user in the actual operation process, and seriously affect the convenience of the user's operation.

There are also some documents that disclose that a sensor is installed inside the trimming head to sense the length of the trimming line and transmit the signal to a control portion to control the realization of the acceleration or deceleration of the trimming head. It also requires the trimming head to have a large speed difference, and the speed difference is generally required to be more than 30%, and the string trimmer that senses the signal and controls the feeding through the sensor is not reflected in the products of the related technology. It is obtained through multi-party demonstration that in the actual feeding process, there will generally be situations where the line cannot be put out or the line is too long. The reliability of this type of string trimmer is extremely poor, and it cannot adapt to a more complicated working condition when the string trimmer is working.

SUMMARY

In one example, a string trimmer includes: a trimming head; and a driving device including a motor for driving the trimming head to rotate around a rotation axis; wherein the trimming head includes: a spool for winding a trimming line; a head housing formed with an accommodating space, wherein the spool is at least partially accommodated in the accommodating space; and a transmission member mounted to the spool, wherein the transmission member includes a driving portion for driving the head housing to rotate synchronously with the spool; wherein the head housing is formed with a mating portion to mate with the driving portion; wherein the mating portion is formed with a mating surface for contacting the driving portion to apply a reacting force to the driving portion and a return surface for contacting the driving portion to apply a reacting force to the driving portion; when the driving portion mates with the mating surface, the trimming head is in a working state; when the driving portion mates with the return surface, the trimming head is in an autonomous line-feeding state; when the trimming head is in the autonomous line-feeding state and the driving portion mates with the return surface, the return surface has a projection line in a plane perpendicular to the rotation axis, and the projection line includes a first extreme position and a second extreme position that can push the transmission member to return to the mating surface; the string trimmer further includes a first circumference centered on the rotation axis and passing through the first extreme position, and a second circumference centered on the rotation axis and passing through the second extreme position; the angle formed by a tangent line of the first circumference at a first extreme position and a tangent line of the second circumference at the second extreme position is less than or equal to 45°; relative to the spool, the transmission member further has a first position that prevents a relative rotation between the spool and the head housing and a second position that allows the relative rotation between the spool and the head housing; wherein, when the transmission member is in the first position, the trimming head is in a trimming state, and the motor has a first rotation speed; when the transmission member is in the second position, the trimming head is in the autonomous line-feeding state, the motor has a second rotation speed, the ratio of the absolute value of the difference between the first rotation speed and the second rotation speed to the first rotation speed is greater than or equal to 0 and less than or equal to 0.15, and the relative rotation is generated between the spool and the head housing in order to feed the trimming line.

In one example, the ratio of the absolute value of the difference between the first rotation speed and the second rotation speed to the first rotation speed is greater than or equal to 0 and less than or equal to 0.1.

In one example, the ratio of the absolute value of the difference between the first rotation speed and the second rotation speed to the first rotation speed is greater than or equal to 0 and less than or equal to 0.15.

In one example, the trimming line has an effective length extending from the accommodating space, and the trimming line has a preset value within an effective length range; when the effective length of the trimming line is greater than the preset value, the transmission member is in the first position; when the effective length of the trimming line is less than the preset value, the transmission member is in the second position.

In one example, the transmission member includes the driving portion for driving the head housing to rotate synchronously with the spool; the head housing is formed with the mating portion for mating with the driving portion; the mating portion includes first teeth distributed around the rotation axis; the head housing is formed with or connected with second teeth for resetting the transmission member; the first teeth and the second teeth are staggered around the rotation axis; in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle $\beta$ formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through the first straight line; the limiting portion is formed with a sliding rail for the transmission member to slide, and the limiting member and the limiting portion include at least two contact surfaces in a direction of a straight line perpendicular to the rotation axis.

In one example, when the trimming head is driven by the motor to rotate around the rotation axis, the transmission member has a friction force in a straight line perpendicular to the rotation axis relative to the spool, and the friction force is in the opposite direction of the centrifugal force generated by the transmission member.

In one example, the spool is further formed with or connected with a receiving groove, and a biasing element is arranged in the receiving groove, one end of the biasing element abuts against the bottom of the receiving groove, and the other end abuts against the transmission member.

In one example, a string trimmer includes: a trimming head; and a driving device including a motor for driving the trimming head to rotate around a rotation axis; wherein the trimming head includes: a spool for winding a trimming line; a head housing formed with an accommodating space, wherein the spool is at least partially accommodated in the accommodating space; and a linkage device for linking the spool and head housing; wherein the linkage device includes: a transmission member having a first position that prevents a relative rotation between the spool and the head housing relative to the spool and a second position that allows the relative rotation between the spool and the head housing relative to the spool; wherein when the transmission member is in the first position, the trimming head is in a trimming state, and the motor has a first rotation speed; when the transmission member is in the second position, the trimming head is in the autonomous line-feeding state, the motor has a second rotation speed, the ratio of the absolute value of the difference between the first rotation speed and the second rotation speed to the first rotation speed is greater than or equal to 0 and less than or equal to 0.05; the relative rotation is generated between the spool and the head housing to feed the trimming line.

In one example, the ratio of the absolute value of the difference between the first rotation speed and the second rotation speed to the first rotation speed is greater than or equal to 0 and less than or equal to 0.1.

In one example, the ratio of the absolute value of the difference between the first rotation speed and the second rotation speed to the first rotation speed is greater than or equal to 0 and less than or equal to 0.15.

In one example, the trimming line has an effective length extending from the accommodating space, and the trimming line has a preset value within an effective length range; when the effective length of the trimming line is greater than the preset value, the transmission member is in the first position; when the effective length of the trimming line is less than the preset value, the transmission member is in the second position.

In one example, the transmission member includes a driving portion for driving the head housing to rotate synchronously with the spool; the head housing is formed with a mating portion for mating with the driving portion; the mating portion includes first teeth distributed around the rotation axis; the head housing is formed with or connected with second teeth for resetting the transmission member; the first teeth and the second teeth are staggered around the rotation axis; in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle $\beta$ formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through the first straight line; the limiting portion is formed with a sliding rail for the transmission member to slide, and the limiting member and the limiting portion include at least two contact surfaces in a direction of a straight line perpendicular to the rotation axis.

In one example, when the trimming head is driven by the motor to rotate around the rotation axis, the transmission member has a friction force in a straight line perpendicular to the rotation axis relative to the spool, and the friction force is in the opposite direction of the centrifugal force generated by the transmission member.

In one example, the spool is further formed with or connected to a receiving groove, a biasing element is arranged in the receiving groove, one end of the biasing element abuts against a bottom of the receiving groove, and the other end abuts against the transmission member.

In one example, a string trimmer includes: a trimming head; and a driving device including a motor for driving the trimming head to rotate around a rotation axis; wherein the trimming head includes: a spool for winding a trimming line; a head housing formed with an accommodating space, wherein the spool is at least partially accommodated in the accommodating space; and a transmission member having a first position that prevents a relative rotation between the spool and the head housing relative to the spool and a second position that allows the relative rotation between the spool and the head housing relative to the spool; wherein the trimming head is in a working state and the transmission member rotates around the rotation axis synchronously with the spool when the transmission member is in the first position; the trimming head is in the autonomous line-feeding state and the relative rotation is generated between the spool and the head housing to feed the trimming line when the transmission member is in the second position; wherein the center of mass of the transmission member deviates from the rotation axis; when the trimming head is driven to rotate by the motor, the transmission member is subjected to a centrifugal force which cause a moving tendency in a direction from the first position to the second position; when the head housing rotates around the rotation axis, the head housing also applies a resistance to the transmission member against the centrifugal force to prevent the transmission member from moving from the first position to the second position; when the trimming head is in a trimming state and the length of an effective portion of the trimming line extending beyond the head housing is less than a preset value, the resistance applied by the head housing to the transmission member is reduced so that the transmission member moves from the first position to the second position under the centrifugal force.

In one example, when an effective length of the trimming line is greater than the preset value, the transmission member is in the first position; when the effective length of the trimming line is less than the preset value, the transmission member is in the second position.

In one example, the transmission member includes a driving portion for driving the head housing to rotate synchronously with the spool; the head housing is formed with a mating portion to mate with the driving portion; the mating portion includes first teeth distributed around the rotation axis; the head housing is formed with or connected with second teeth for resetting the transmission member; the first teeth and the second teeth are staggered around the rotation axis.

In one example, in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a limiting portion is formed on the spool to limit the rotation of the transmission member around the rotation axis, and the limiting portion is symmetrically arranged with respect to a symmetry plane passing through a first straight line; the limiting portion is formed with a sliding rail for the transmission member to slide; the limiting member and the limiting portion include at least two contact surfaces in a straight line perpendicular to the rotation axis.

In one example, when the trimming head is driven by the motor to rotate around the rotation axis, the transmission member has a friction force in a straight line perpendicular to the first rotation axis relative to the spool, and the friction force is in the opposite direction of the centrifugal force generated by the transmission member.

In one example, the spool is further formed with or connected with a receiving groove, a biasing element is arranged in the receiving groove, one end of the biasing element abuts against the bottom of the receiving groove, and the other end abuts against the transmission member.

In one example, a trimming head is used for a string trimmer and is capable of being driven to rotate around a rotation axis to achieve grass trimming; wherein the trimming head includes: a spool for winding a trimming line; a head housing surrounding to form an accommodating space; a transmission member having a first position that prevents a relative rotation between the spool and the head housing relative to the spool and a second position that allows the relative rotation between the spool and the head housing relative to the spool; wherein the transmission member rotates around the rotation axis synchronously with the spool and the trimming head is in a trimming state when the transmission member is in the first position; the relative rotation is generated between the spool and the head housing to feed the trimming line when the transmission member is in the second position; the center of mass of the transmission member deviates from the rotation axis; when the trimming head is rotating, the transmission member is subjected to a centrifugal force which cause a moving tendency in a direction from the first position to the second position; when the head housing rotates around the rotation axis, the head housing also applies a resistance to the transmission member against the centrifugal force to prevent the transmission member from moving from the first position to the second position; when the trimming head is in the trimming state and the length of an effective portion of the trimming line extending beyond the head housing is less than a preset value, the resistance applied by the head housing to the transmission member is reduced so that the transmission member moves from the first position to the second position under the centrifugal force.

In one example, the transmission member includes a driving portion for driving the head housing to rotate synchronously with the spool; the head housing is formed with a mating portion for mating with the driving portion; the mating portion includes first teeth distributed around the rotation axis; the head housing is formed with or connected with second teeth for resetting the transmission member; the first teeth and the second teeth are staggered around the rotation axis; in a circumferential range around the rotation axis, each of the second teeth has a tooth surface distributed toward the rotation axis, and the tooth surface has a return surface facing the rotation axis and the return surface is gradually changing.

In one example, a string trimmer includes: a trimming head for trimming grass; and a driving device including a motor for driving the trimming head to rotate around a rotation axis; wherein the trimming head includes: a spool for winding a trimming line; a head housing formed with an accommodating space, wherein the spool is at least partially accommodated in the accommodating space; and a linkage device for realizing power transmission between the spool and the head housing; wherein the string trimmer has a trimming state, and the linkage device drives the spool or the head housing to rotate around the rotation axis and in a first rotation direction when the string trimmer is in a working state; wherein the linkage device includes: a transmission member having a first position that prevents a relative rotation between the spool and the head housing relative to the spool and a second position that allows the relative rotation between the spool and the head housing relative to the spool; the trimming head also has an automatic winding state and an autonomous line-feeding state; when the trimming head is in the automatic winding state, the motor drives the spool to rotate relative to the head housing in a second rotation direction so that the trimming line is wound to the spool; when the trimming head is in the autonomous line-feeding state, the transmission member moves to the second position, and the spool rotates relative to the head housing along the first rotating direction to release the trimming line; wherein the transmission member is subjected to a centrifugal force which cause a moving tendency in a direction from the first position to the second position when the trimming head is driven to rotate by the motor; when the head housing rotates around the rotation axis, the head housing also applies a resistance to the transmission member against the centrifugal force to prevent the transmission member from moving from the first position to the second position; when the trimming head is in the working state and the length of an effective portion of the trimming line extending beyond the head housing is less than a preset value, the resistance applied by the head housing to the transmission member is reduced so that the transmission member moves from the first position to the second position under the centrifugal force.

In one example, a damping device for damping at least one of the spool or the head housing to make the string trimmer in the automatic winding state is further included.

In one example, the damping device includes: a damping member for preventing the spool from rotating in a first direction; wherein in the automatic winding state, the head housing rotates in the first direction.

In one example, the damping device includes: a damping member for preventing the head housing from rotating in a second direction; wherein in the automatic winding state, the spool rotates in the second direction.

In one example, the transmission member includes a driving portion for driving the head housing to rotate synchronously with the spool; the head housing is formed with a mating portion for mating with the driving portion.

In one example, the mating portion includes first teeth distributed around the rotation axis; the head housing is formed with or connected with second teeth for resetting the transmission member; the first teeth and the second teeth are staggered around the rotation axis;

In one example, in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects a mating surface and is away from the rotation axis, and the second section and the tooth surface form a guiding channel for the transmission member to rotate around the rotation axis.

In one example, a central angle α formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through a first straight line; the limiting portion is formed with a sliding rail for the transmission member to slide, and the limiting member and the limiting portion include at least two contact surfaces in a straight line perpendicular to the rotation axis.

In one example, the spool is further formed with or connected with a receiving groove, a biasing element is arranged in the receiving groove, one end of the biasing element abuts against the bottom of the receiving groove, and the other end abuts against the transmission member.

In one example, a trimming head is used for string trimmer and capable of being driven to rotate around a rotation axis to achieve grass trimming; wherein the trimming head includes: a spool for winding a trimming line; a head housing formed with an accommodating space, wherein the spool is at least partially accommodated in the accommodating space; and a transmission member mounted to the spool, wherein the transmission member includes a driving portion for driving the head housing to rotate synchronously with the spool; wherein the head housing is formed with a mating portion to mate with the driving portion; wherein the mating portion is formed with a mating surface for contacting with the driving portion to apply a reacting force to the driving portion, the mating surface extends in a first plane, and the first plane is substantially parallel to the rotation axis; and the distance between the rotation axis and the first plane is greater than zero.

In one example, the distance between the rotation axis and the first plane is greater than 0 and less than or equal to 20 mm.

In one example, the mating surface includes an effective surface capable of applying the reaction force, the effective surface having a projection line in a plane perpendicular to the rotation axis, the projection line includes a first extreme position and a second extreme position, and the central angle between the first extreme position and the second extreme position and the axis of the rotation axis is greater than 0° and less than or equal to 45°.

In one example, the central angle between the first extreme position and the second extreme position and the axis of the rotation axis is greater than or equal to 3° and less than or equal to 40°.

In one example, relative to the spool, the transmission member has a first position that prevents a relative rotation between the spool and the head housing and a second position that allows the relative rotation between the spool and the head housing; the trimming line has an effective length extending from the accommodating space, and the trimming line has a preset value within an effective length range; when the effective length of the trimming line is greater than the preset value, the transmission member is in the first position; when the effective length of the trimming line is less than the preset value, the transmission member is in the second position.

In one example, the mating portion includes first teeth distributed around the rotation axis; the head housing is formed with or connected with second teeth for resetting the transmission member; the first teeth and the second teeth are staggered around the rotation axis.

In one example, in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle α formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through a first straight line; the limiting portion is formed with a sliding rail for the transmission member to slide, and the limiting member and the limiting portion include at least two contact surfaces in a straight line perpendicular to the rotation axis.

In one example, a trimming head is used for string trimmer and is capable of being driven to rotate around a rotation axis to achieve grass trimming; wherein the trimming head includes: a spool for winding a trimming line; a head housing formed with an accommodating space, wherein the spool is at least partially accommodated in the accommodating space; and a transmission member mounted to the spool, wherein the transmission member includes a driving portion for driving the head housing to rotate synchronously with the spool; wherein the head housing is formed with a mating portion to mate with the driving portion; wherein the mating portion is formed with a mating surface for contacting the driving portion to apply a reaction force to the driving portion, the mating surface includes an effective surface capable of applying the reaction force, the effective surface has a projection line in a plane perpendicular to the rotation axis, the projection line includes a first extreme position and a second extreme position, and the central angle between the first extreme position and the second extreme position and the axis of the rotation axis is greater than 0° and less than or equal to 45°.

In one example, the central angle between the first extreme position and the second extreme position and the axis of the rotation axis is greater than or equal to 3° and less than or equal to 40°.

In one example, relative to the spool, the transmission member has a first position that prevents a relative rotation between the spool and the head housing and a second position that allows the relative rotation between the spool and the head housing; the trimming line has an effective length extending from the accommodating space, and the trimming line has a preset value within an effective length range; when the effective length of the trimming line is greater than the preset value, the transmission member is in the first position; when the effective length of the trimming line is less than the preset value, the transmission member is in the second position.

In one example, the mating portion includes first teeth distributed around the rotation axis; the head housing is formed with or connected with second teeth for resetting the transmission member; the first teeth and the second teeth are staggered around the rotation axis;

In one example, in a circumferential range around the rotation axis, each of the second teeth has a tooth surface distributed toward the rotation axis, and the tooth surface has a return surface facing the rotation axis and the return surface is gradually changing.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle β formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through a first straight line; the limiting portion is formed to provide a sliding rail for the transmission member to slides, and the limiting member and the limiting portion include at least two contact surfaces in the direction of a straight line perpendicular to the rotation axis.

In one example, the spool is further formed with or connected with a receiving groove, a biasing element is arranged in the receiving groove, one end of the biasing element abuts against the bottom of the receiving groove, and the other end abuts against the transmission member.

In one example, a trimming head is used for string trimmer and is capable of being driven to rotate around a rotation axis to achieve grass trimming; wherein the trimming head includes: a spool for winding a trimming line; a head housing formed with an accommodating space, wherein the spool is at least partially accommodated in the accommodating space; and a transmission member mounted to the spool, wherein the transmission member includes a driving portion for driving the head housing to rotate synchronously with the spool; wherein the head housing is formed with a mating portion to mate with the driving portion; wherein the mating portion is formed with a mating surface for contacting with the driving portion to apply a reacting force to the driving portion; the mating surface has a projection line in a plane perpendicular to a rotation axis; the projected line includes a first extreme position and a second extreme position at which a reacting force can be applied to the driving portion, the mating surface includes an effective action surface that can apply the reacting force, and the effective action surface is disposed between the first extreme position and the second extreme position.

In one example, a trimming head is used for string trimmer and is capable of being driven to rotate around a rotation axis to achieve grass trimming; wherein the trimming head includes: a spool for winding a trimming line; a head housing formed with an accommodating space, wherein the spool is at least partially accommodated in the accommodating space; and a transmission member mounted to the spool, wherein the transmission member includes a driving portion for driving the head housing to rotate synchronously with the spool; wherein the head housing is formed with a mating portion to mate with the driving portion; wherein the mating portion is formed with a mating surface for contacting the driving portion to apply a reacting force to the driving portion, and a return surface for contacting the driving portion to apply a reacting force to the driving portion; when the driving portion mates with the mating surface, the trimming head is in a working state; when the driving portion mates with the return surface, the trimming head is in an autonomous line-feeding state; when the trimming head is in the autonomous line-feeding state and the driving portion mates with the return surface, the return surface has a projection line in a plane perpendicular to the rotation axis, and the projection line includes a first extreme position and a second extreme position that can push the transmission member to return to mate with the mating surface; the string trimmer further includes a first circumference centered on the rotation axis and passing through the first extreme position, and a second circumference centered on the rotation axis and passing through the second extreme position; the angle formed by a tangent line of the first circumference at a first extreme position and a tangent line of the second circumference at the second extreme position is less than or equal to 45°.

In one example, the angle formed by the tangent of the first circumference at the first extreme position and the tangent of the second circumference at the second extreme position is less than or equal to 30°.

In one example, the transmission member has a first position that prevents a relative rotation between the spool and the head housing relative to the spool and a second position that allows the relative rotation between the spool and the head housing relative to the spool;

In one example, the trimming line has an effective length extending from the accommodating space, and the trimming line has a preset value within an effective length range; when the effective length of the trimming line is greater than the preset value, the transmission member is in the first position; when the effective length of the trimming line is less than the preset value, the transmission member is in the second position.

In one example, when the driving portion moves to the first extreme position and the second extreme position, the trimming line has a reacting force acting on the head housing, and the return surface has a first component force that pushes the transmission member to reset and a second force component that is opposite to the reacting force applied to the head housing by the trimming line.

In one example, the mating portion includes first teeth distributed around the rotation axis; the first teeth are formed or connected with the mating surface;

In one example, the head housing is formed with or connected with second teeth for resetting the transmission member, each of the second teeth is formed with or connected with a return surface; the first teeth and the second teeth are staggered around the rotation axis.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle β formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through a first straight line; the limiting portion is formed with a sliding rail for the transmission member to slide, and the limiting member and the limiting portion include at least two contact surfaces in a straight line perpendicular to the rotation axis.

In one example, when the trimming head is driven by the motor to rotate around the rotation axis, the transmission member has a friction force in a straight line perpendicular to the rotation axis relative to the spool, and the friction force is in the opposite direction of the centrifugal force generated by the transmission member.

In one example, the spool is further formed with or connected with a receiving groove, a biasing element is arranged in the receiving groove, one end of the biasing element abuts against the bottom of the receiving groove, and the other end abuts against the transmission member.

In one example, a trimming head is used for string trimmer is capable of being driven to rotate around a rotation axis to achieve grass trimming; wherein the trimming head includes: a spool for winding a trimming line; a head housing formed with an accommodating space, wherein the spool is at least partially accommodated in the accommodating space; and a linkage device for realizing power transmission between the spool and the head housing; wherein the head housing is formed with an outer threading aperture capable of inserting the trimming line into the spool, and the spool is formed with a coupling portion capable of allowing the trimming line inserted into the head housing from the outer threading aperture to be connected to the spool; the linkage device includes a transmission member mounted to the spool, and the transmission member includes a driving portion for driving the head housing to rotate synchronously with the spool; the head housing is formed with a mating portion to mate with the driving portion; when the trimming head rotates around the rotation axis, and when the transmission member rotates with the spool around the rotation axis, the transmission member generates a centrifugal force along a straight line, and the mating portion and the driving portion contacts and applies a force to the driving portion; the force is decomposed into a first component force in a direction perpendicular to the straight line and a second component force along the direction of the straight line and opposite to the direction of the centrifugal force to prevent the transmission member from moving along the direction of the straight line.

In one example, the spool is formed with an inner threading aperture, and when the outer threading aperture and the inner threading aperture are located in a same radial direction, the trimming line can pass through the outer threading aperture and the inner threading aperture in sequence.

In one example, the coupling portion is a threading channel, and the transmission channel penetrates the spool and connects any two inner threading apertures on the spool.

In one example, the threading channel extends along a curve.

In one example, the transmission member includes a driving portion for driving the head housing to rotate synchronously with the spool; the head housing is formed with a mating portion to mate with the driving portion.

In one example, the mating portion includes first teeth distributed around the rotation axis;

In one example, the head housing is formed with or connected with second teeth for resetting the transmission member; the first teeth and the second teeth are staggered around the rotation axis;

In one example, in a circumferential range around the rotation axis, each of the second teeth has a tooth surface distributed toward the rotation axis, and the tooth surface has a protrusion facing the rotation axis and the protrusion is gradually changing.

In one example, the tooth surface includes a first section and a second section; the first section and the tooth surface of the first teeth away from the rotation axis form a section for the transmission member to move radially along a direction perpendicular to the rotation axis; the second section and the tooth surface of the first teeth away from the rotation axis form a guiding channel for the transmission member to rotate around the rotation axis.

In one example, a central angle α formed by a tooth tip and a tooth bottom of the second teeth and the axis of the rotation axis is greater than or equal to 30° and less than or equal to 50°.

In one example, a limiting portion is formed on the spool to limit the rotation of the transmission member around the rotation axis, and the limiting portion is symmetrically arranged with respect to a symmetry plane passing through a first straight line; the limiting portion is formed with a sliding rail for the transmission member to slide, and the limiting member and the limiting portion include at least two contact surfaces in a straight line perpendicular to the rotation axis.

In one example, the spool is further formed with or connected with a receiving groove, a biasing element is arranged in the receiving groove, one end of the biasing element abuts against the bottom of the receiving groove, and the other end abuts against the transmission member.

In one example, a trimming head includes: a spool for winding a trimming line; a head housing formed with an accommodating space, wherein the spool is at least partially accommodated in the accommodating space; and a linkage device for realizing power transmission between the spool and the head housing; wherein the head housing is formed with an outer threading aperture capable of inserting the trimming line into the spool, and the spool is formed with a coupling portion capable of allowing the trimming line inserted into the head housing from the outer threading aperture to be connected to the spool; wherein the linkage device includes: a transmission member has a first position that prevents a relative rotation between the spool and the head housing relative to the spool and a second position that allows the relative rotation between the spool and the head housing relative to the spool; wherein when the transmission member is in the first position, the trimming head is in a working state, and the transmission member rotates around the rotation axis synchronously with the spool; when the transmission member is in the second position, the trimming head is in an autonomous line-feeding state, the relative rotation is generated between the spool and the head housing to feed the trimming line.

In one example, a transmission member mounted to the spool, and the transmission member includes a driving portion for driving the head housing to rotate synchronously with the spool; the head housing is formed with a mating portion to mate with the driving portion; when the trimming head rotates around a rotation axis, and when the transmission member rotates with the spool around the rotation axis, the transmission member generates a centrifugal force along a straight line, and the mating portion and the driving portion contacts and applies a force to the driving portion; the force is decomposed into a first component force in a direction perpendicular to the straight line and a second component force along the direction of the straight line and opposite to the direction of the centrifugal force to prevent the transmission member from moving along the direction of the straight line.

In one example, the spool is formed with an inner threading aperture, and when the outer threading aperture and the inner threading aperture are located in a same radial direction, the trimming line can pass through the outer threading aperture and the inner threading aperture in sequence.

In one example, the coupling portion is a threading channel, and the transmission channel penetrates the spool and connects any two inner threading apertures on the spool.

In one example, the threading channel extends along a curve.

In one example, when the trimming head is driven by the motor to rotate around the rotation axis, the transmission member has a friction force in a straight line perpendicular to the rotation axis relative to the spool, and the friction force is in the opposite direction of the centrifugal force generated by the transmission member.

In one example, the mating portion includes first teeth distributed around the rotation axis; the first teeth are formed or connected with the mating surface;

In one example, the head housing is formed with or connected with second teeth for resetting the transmission member, each of the second teeth is formed with or connected with a return surface; the first teeth and the second teeth are staggered around the rotation axis.

In one example, the return surface includes a first section and a second section, and the first section and the driving portion substantially do not generate an interaction force; each of the first teeth includes a tooth surface that intersects the mating surface and is away from the rotation axis; the second section and the tooth surface form a guiding channel for the transmission member to rotate around the rotation axis.

In one example, a central angle β formed by a tooth tip and a tooth bottom of the second teeth and the axis of the rotation axis is greater than or equal to 30° and less than or equal to 50°.

In one example, the spool is further formed with or connected with a receiving groove, a biasing element is arranged in the receiving groove; one end of the biasing element abuts against the bottom of the receiving groove, and the other end abuts against the transmission member.

In one example, the automatically feeding of the trimming line of the trimming head itself when the trimming line is shortened to the preset length is realized to meet the demand for the length of the trimming line during trimming by setting the transmission member mated with the driving device and through purely mechanical cooperation. There is no need to manually determine the conditions of the feeding, and the reliability and the using convenience of the line-feeding of the string trimmer is improved.

DETAILED DESCRIPTION

Figure 1:
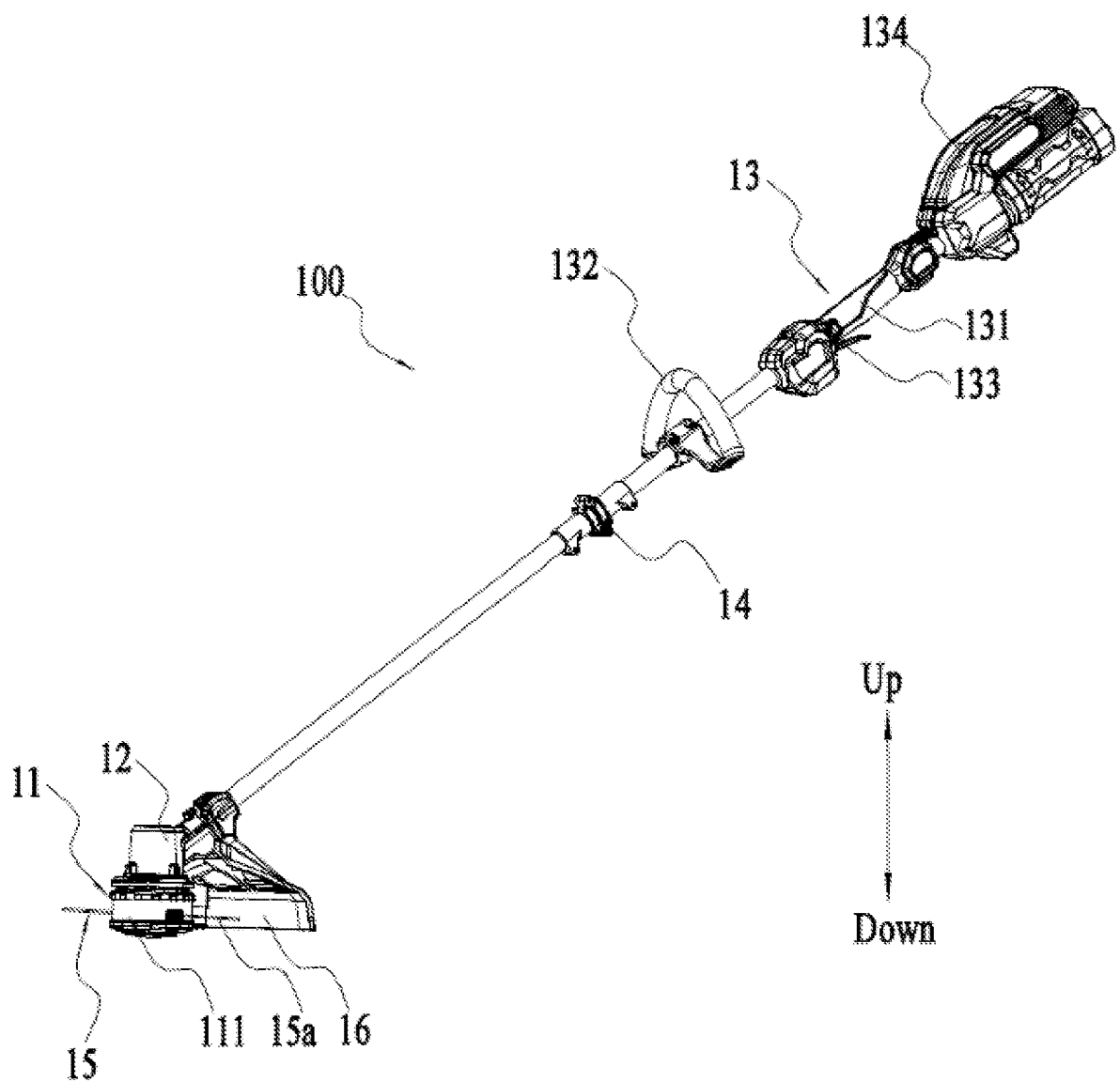
FIG. 1 is a perspective view of a string trimmer.

A string trimmer 100 shown in FIG. 1 includes a trimming head 11, a driving device 12, an operating device 13, and a connecting device 14.

Figure 2:
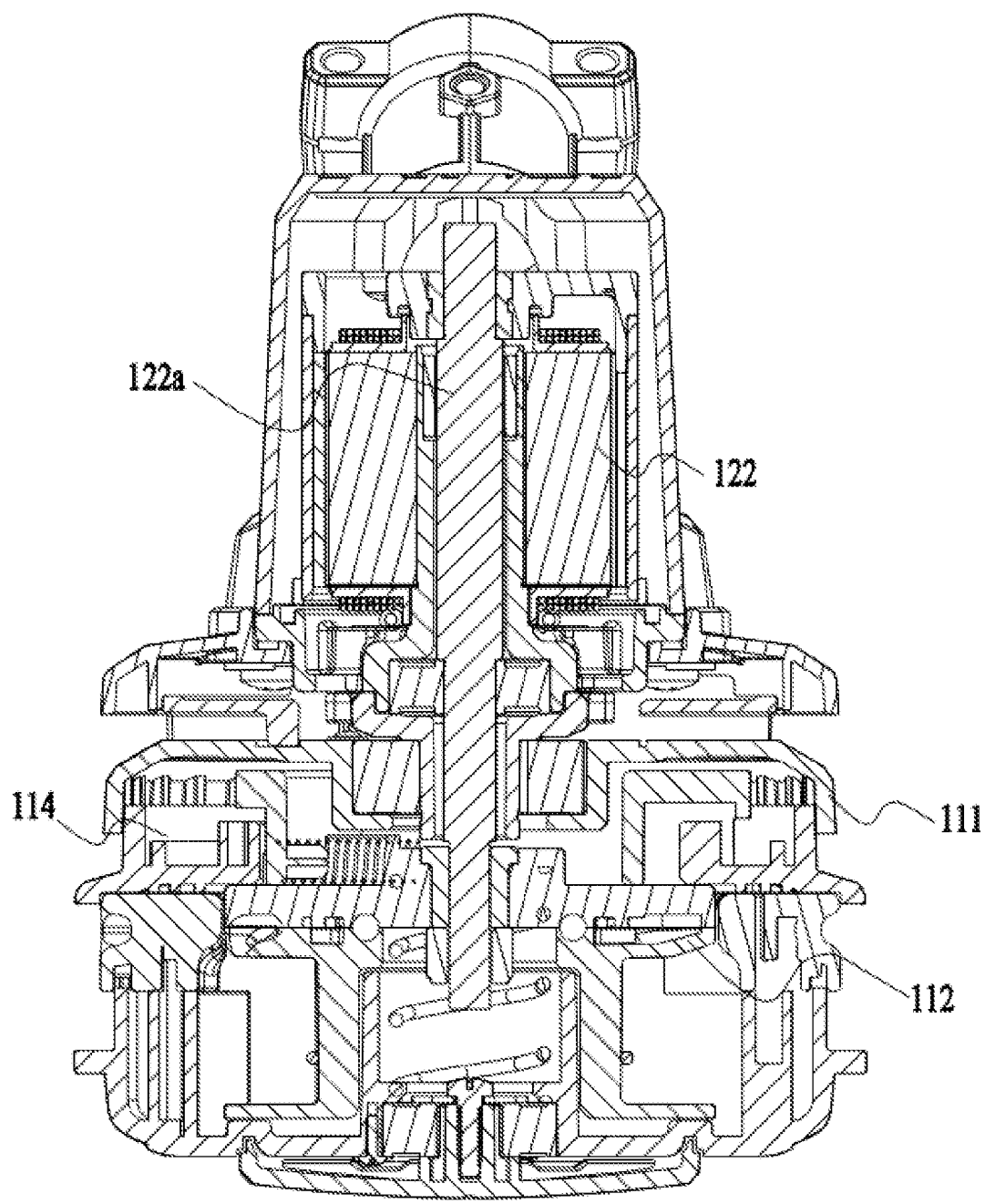
FIG. 2 is a section view of a trimming head for the string trimmer of FIG. 1.

As shown in FIG. 1 to FIG. 2, the trimming head 11 is used to install a trimming line 15 for realizing the trimming function. The driving device 12 is used to provide a rotational power to the trimming head 11. The driving device 12 includes a motor 122 and a first housing 121. The motor 122 is arranged in the first housing 121. The motor 122 drives the trimming head 11 to rotate by a rotation axis 101. The operating device 13 includes a handle 131, an auxiliary handle 132, a main switch 133 and a second housing 134. The handle 131 and the auxiliary handle 132 are used for the users to hold by two hands separately, so that the string trimmer 100 can be operated more stably. The main switch 133 can be positioned on the handle 131, and the user can directly operate the main switch 133 to control the string trimmer 100 to trim grass when holding the handle 131. The second housing 134 is for forming a coupling portion that is combined with the power supply device. For example, the coupling portion can be combined with a battery pack to supply power to the string trimmer 100. In this example, the handle 131 and the second housing 134 are formed separately. In some other examples, the handle 131 can also be integrally formed with the second housing 134. The connecting device 14 includes a connecting rod for connecting the first housing 121 and the second housing 134. The auxiliary handle 132 is also installed to the connecting rod, and the auxiliary handle 132 is also located between the first housing 121 and the second housing 134. The string trimmer 100 further includes a guard 16 which is at least partially surrounding the trimming head 11, which in turn prevent the debris from flying to the direction where the user or operator stands when the string trimmer 11 is trimming the grass.

In order to facilitate the description of the technical solution of the present disclosure, a upper side and a lower side are defined as shown in FIG. 1, wherein the driving device 12 is arranged on the upper side of the trimming head 11, and the trimming head 11 is arranged on the lower side of the driving device 12.

The trimming head 11 also includes a head housing 111, a spool 112 and a linkage device 113. The head housing 111 is formed with an accommodating space 114 around the rotation axis 101 and the accommodating space 114 can accommodate at least a part of the spool 112. The side of the head housing 111 forming the accommodating space 114 is the inner side of the head housing 111, and the side of the head housing 111 opposite to the inner side is outside.

As shown in FIG. 1 to FIG. 4, the spool 112 is disposed in the accommodating space 114. That is, the spool 112 is disposed on the inner side of the head housing 111. The spool 112 is used for winding the trimming line 15, and the trimming line 15 is used for trimming grass. The head housing 111 also forms an outer threading aperture 111a for the trimming line 15 to extend to the outside of the head housing 111, and the amount of the outer threading apertures 111a is two. The spool 112 also forms an inner threading aperture 112a. When the inner threading aperture 112a and the outer threading aperture 111a are located in the same radial direction, the trimming line 15 can pass through the outer threading aperture 111a and the inner threading aperture 112a in sequence. Exemplarily, the spool 112 is also formed with a threading channel 112d which connects two inner threading apertures 112a and allows the trimming line 15 to pass through. In fact, the threading channel 112d connects any two inner threading apertures on the spool, and the threading channel is arranged to extend along a curve. When the users need to supplement feed the trimming line 15, the users can insert the trimming line 15 through the outer threading aperture 111a into the accommodating space 114, then pass the threading channel 112d through the inner threading aperture 112a, and to the outside of the head housing 111 from the outer threading aperture 111a on the opposite side. When the trimming line 15 needs to be wound around the spool 112, users do not need to open the head housing 111. It is possible to directly extend the trimming line 15 into the head housing 111 and then wind the trimming line 15 on the spool 112 through the relative rotation of the spool 112 and the head housing 111. Such type of trimming head 11 is usually called an external inserted winding head.

The part of the trimming line 15 extending through the outer threading aperture 111a to the outside of the head housing 111 is defined as an effective portion 15a of the trimming line 15, and the effective portion 15a of the trimming line 15 trims weeds by high-speed rotation. In order to trim weeds within the expected area, the length of the effective portion 15a of the trimming line 15 should reach a preset value. That is, the length of the effective portion 15a of the trimming line 15 should be greater than or equal to the preset value. When the length of the effective portion 15a of the trimming line 15 is less than the preset value, the cutting efficiency of the trimming line 15 may be reduced because the effective portion 15a of the trimming line 15 is relatively short. In order to keep the length of the effective portion 15a of the trimming line 15 to be greater than or equal to the length range of the preset value, the string trimmer 100 in this example can realize it that the linkage device 113 controls the trimming line 15 to be autonomously fed to a length range greater than or equal to the preset value when the length of the effective portion 15a of the trimming line 15 is lower than the preset value. In order to prevent the extension length of the trimming line 15 from being too long and causing interference with the guard 16, the effective portion 15a of the trimming line 15 is actually less than or equal to a limit value. Within this limit, on one hand, the trimming line 15 can effectively mowing the grass and maintain a high mowing efficiency; on the other hand, the trimming line 15 will not interfere with the guard 16, so that mowing can be continued.

The linkage device 113 is used to control whether the trimming head 11 is feeding or not. The linkage device 113 has a first equilibrium state that makes the trimming head 11 to be unable to feed. At this time, the trimming head 11 is in a working state. The linkage device 113 also has a second equilibrium state in which the trimming head 11 can feed the trimming line, and the trimming head 11 is in a autonomously feeding state at this time. In this example, the linkage device 113 can autonomously identify a effective length of the trimming line 15 and can autonomously adjust the trimming head 11 to enter the first equilibrium state or the second equilibrium state according to the length of the effective portion 15a of the trimming line 15, that is to adjust the trimming head 11 to autonomously enter the working state or the autonomously feeding state. It needs to be emphasized that, for the linkage device 113, the autonomous reorganization and adjustment of the working mode of the trimming head 11 is based on the linkage device 113 itself, and there is no need to accept an input from an outside or an indication signal for feeding the line or trimming. The indication signal mentioned here includes a signal that causes the linkage device 113 to switch modes due to an external force, electrical signal, magnetic force, or other force generated by the outside on the trimming head 11. In some common indication signals, it generally includes: tapping the shell of the trimming head 11 to make the spool 112 and the head housing 111 produce a speed difference to feed the trimming line; adjusting the speed through a switch to make the spool 112 and the head housing 111 to produce a speed difference to feed the trimming line; inducting the current change through a sensor induces in the motor to cause a speed difference between the spool 112 and the head housing 111 to feed the trimming line. In addition, the rotation speed of the trimming head 11 in this example is constant, and there is no need to change the rotation speed of motor 122 to make the spool 112 to have a speed change to obtain the speed difference between the head housing 111 and the spool 112 to perform line feeding.

Exemplarily, when the linkage device 113 is in the first equilibrium state, the spool 112 and the head housing 111 are relatively static. In this way, the spool 112 and the head housing 111 will be driven by a motor shaft 122a to rotate synchronously, so that at this time the length of the trimming line 15 wound on the spool 112 extending from the effective portion 15a of the head housing 111 will not change. That is, the trimming line 15 cannot be released, and the trimming head 11 is in a normal working state at this time. When the linkage device 113 is in the second equilibrium state, a relative movement occurs between the spool 112 and the head housing 111. In this way, the trimming line 15 is thrown out relative to the spool 112 under the action of its own centrifugal force, so that the trimming line 15 is released, and the length of the effective portion 15a of the trimming line 15 will increase.

Figure 3:
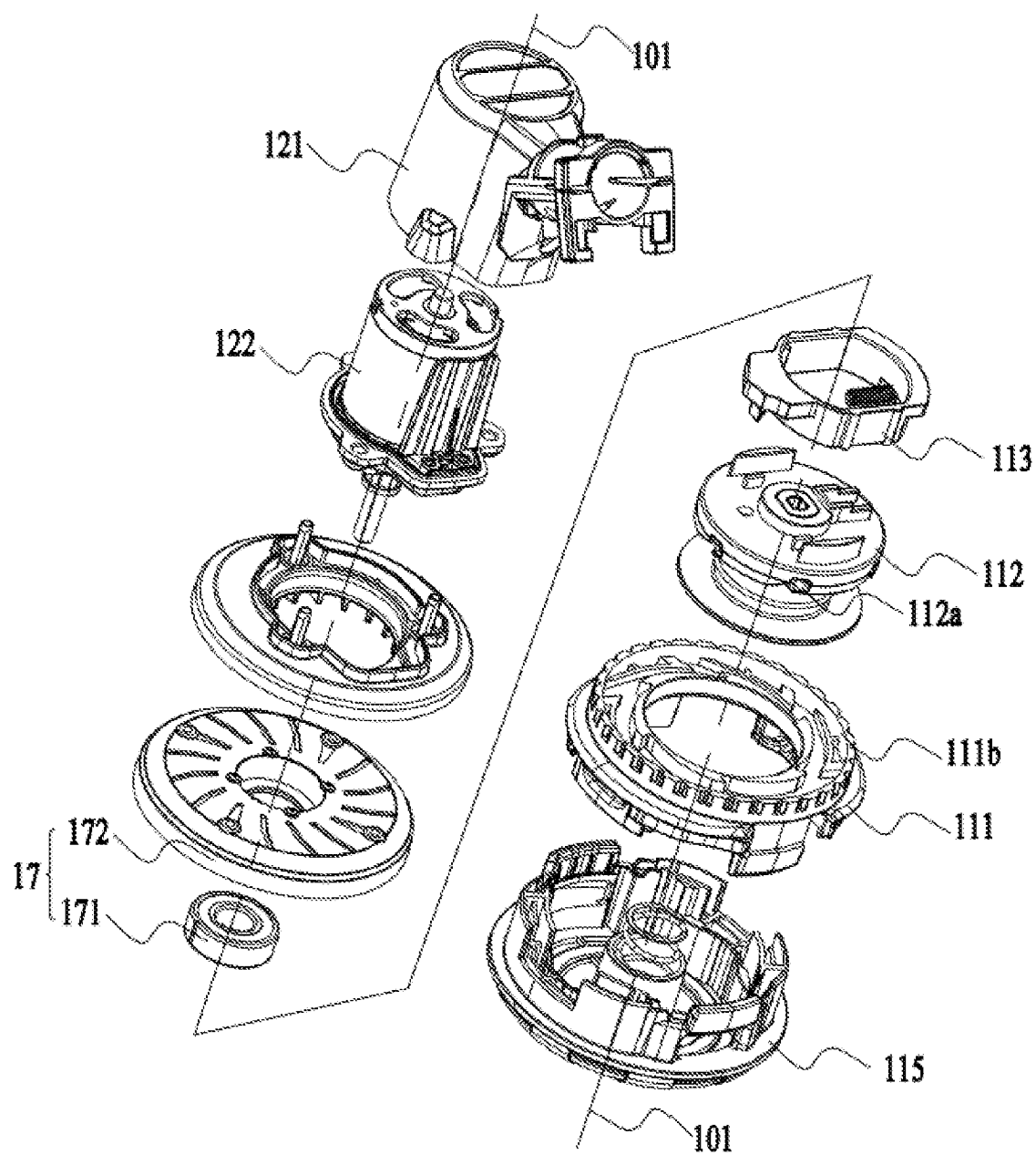
FIG. 3 is an explosion view of the trimming head for the string trimmer of FIG. 1.
Figure 4:
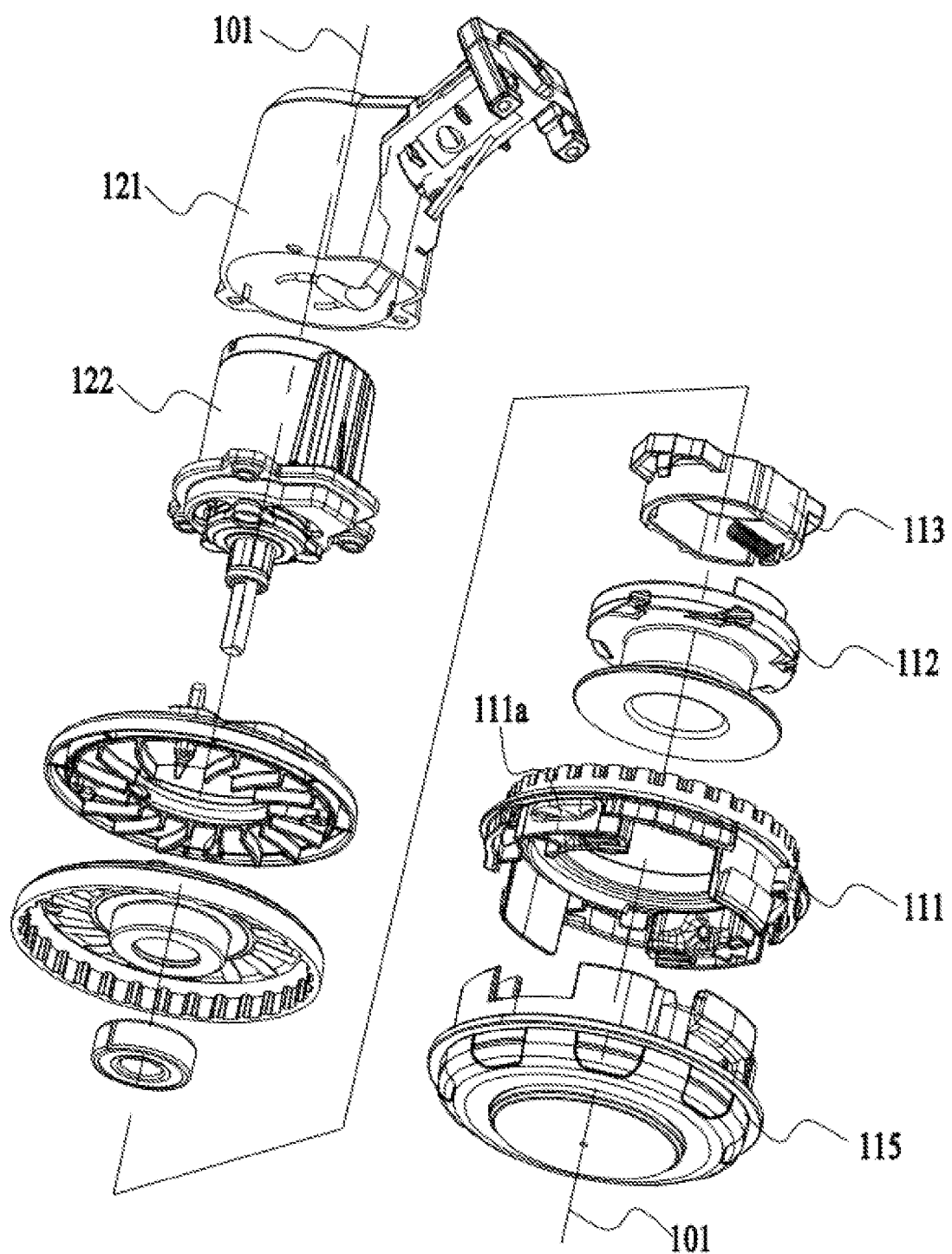
FIG. 4 is an explosion view of the trimming head for the string trimmer on another view.
Figure 5:
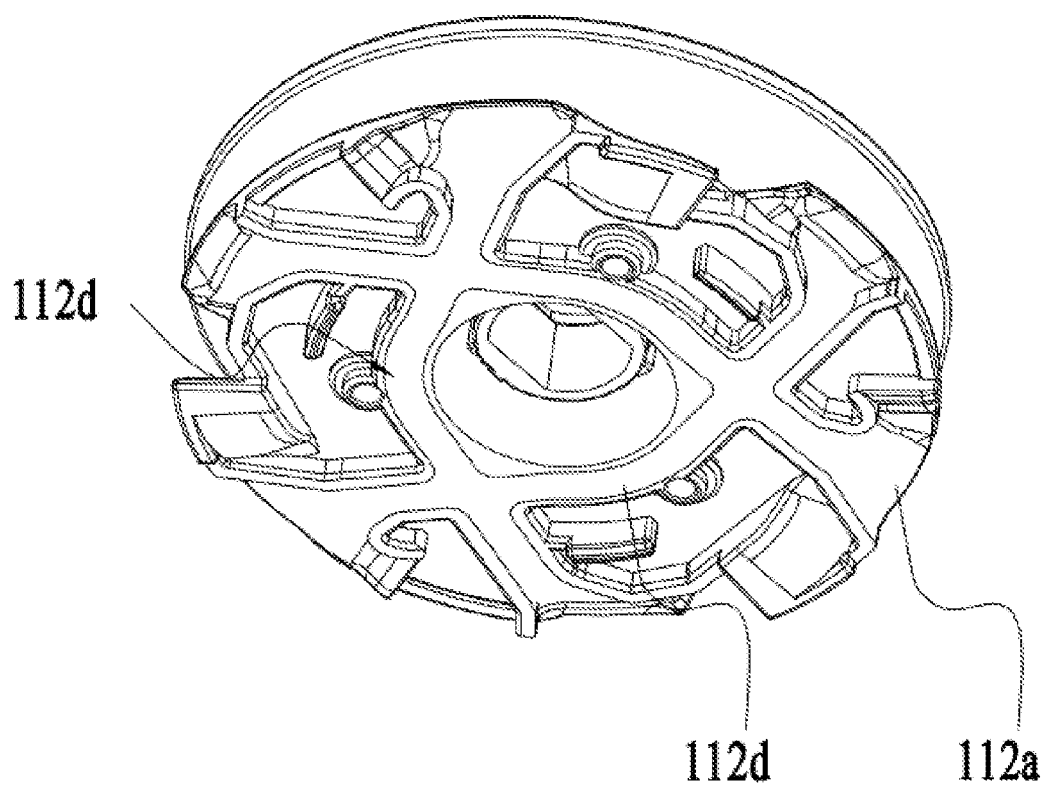
FIG. 5 is a section view of the spool of the string trimmer in FIG. 3.
Figure 6:
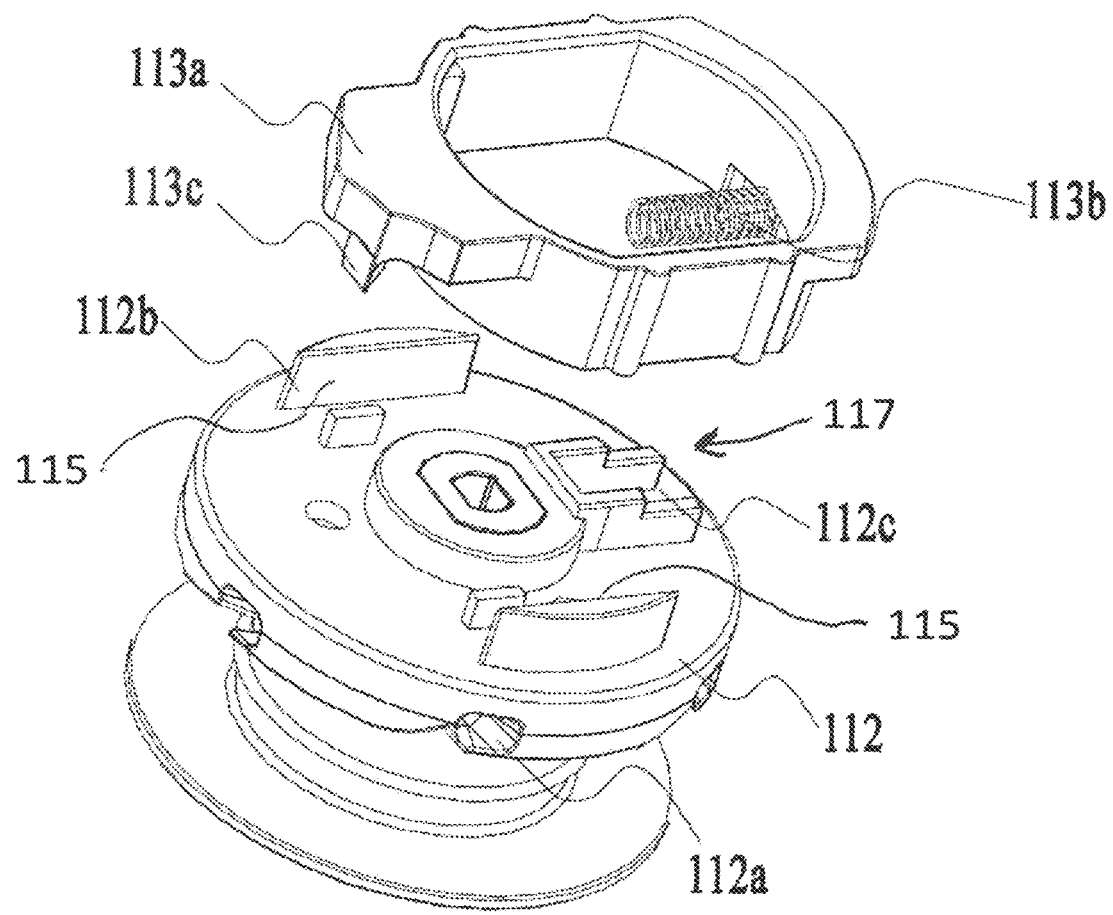
FIG. 6 is a perspective view of a spool and a transmission part of the string trimmer of FIG. 3.
Figure 7:
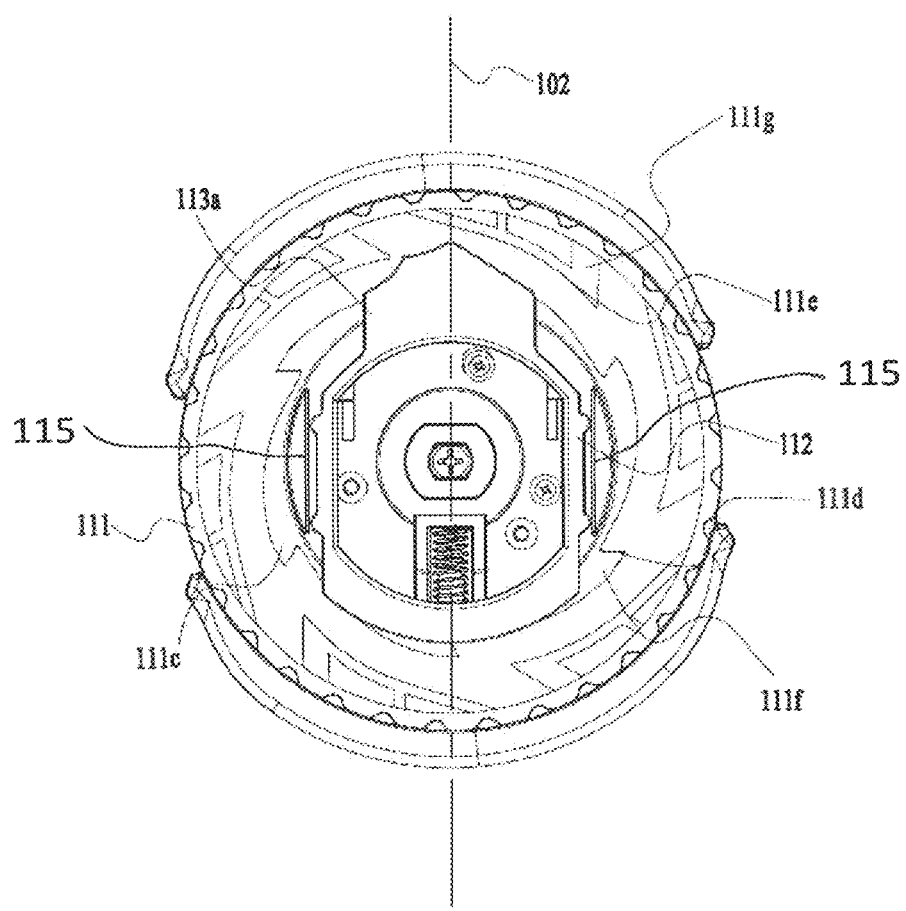
FIG. 7 is a top view of a head housing, the spool and the transmission part of the string trimmer of FIG. 3.

As shown in FIGS. 3 to 4, in some examples, the linkage device 113 includes a transmission member 113a that can move freely between the spool 112 and the head housing 111. When the linkage device 113 is in the first equilibrium state, the transmission member 113a rotates synchronously with the spool 112. At this time, the transmission member 113a is in a first position, and the transmission member 113a also mates with the head housing 111 to drive the head housing 111 to rotate synchronously with the spool 112, and the motor has a first rotation speed at this time; When the linkage device 113 is in the second equilibrium state, the transmission member 113a rotates with the spool 112, and at the same time, the transmission member 113a is disengaged from the head housing 111. At this moment, the transmission member 113a is in a second position. The spool 112 and the head housing 111 can move relative to each other, and the motor 122 has a first rotation speed at this time. As an implementation method, when the transmission member 113a is in the first position or the second position, the ratio of the absolute value of the difference between the first rotation speed and the second rotation speed of the motor 122 to the first rotation speed is greater than or equal to 0 and less than or equal to 0.15. As an implementation method, when the transmission member 113a is in the first position or the second position, the ratio of the absolute value of the difference between the first rotation speed and the second rotation speed of the motor 122 to the first rotation speed is greater than or equal to 0 and less than or equal to 0.1. In fact, in a better state, when the transmission member 113a is in the first position or the second position, the ratio of the absolute value of the difference between the first rotation speed and the second rotation speed of the motor 122 to the first rotation speed is greater than or equal to 0 and less than or equal to 0.05, and the ratio of the absolute value of the difference between the first rotation speed and the second rotation speed of the motor 122 to the first rotation speed approaches zero infinitely. Through such a setting, it is realized that the trimming head 11 has no differential speed change and the autonomous line-feeding, that is, the automatic line-feeding in the true sense. When the driving member 113a of the trimming head 11 is displaced, or the trimming line 15 is released to a preset length due to abrasion in the process of autonomous line-feeding, it all generates a preset force. So when the trimming head 11 is under the influence of the load of the trimming line 15 and the relative movement of the internal parts of the trimming head 11, the rotation speed of the trimming head 11 itself has a preset change, so that the trimming head 11 cannot always rotate with a theoretical absolute constant speed, which resulting in a second speed that is different from the first speed. Here, within the allowable range of the above deviation, it is assumed that the change from the first speed to the second speed of the trimming head 11 is still within the scope of the aforementioned uniform rotation, and the switch of the trimming head 11 between the autonomous line-feeding state and the working state does not depend on the aforementioned changes in speed.

Optionally, in the direction of a straight line 102 which is substantially perpendicular to the direction of the rotation axis 101 or obliquely intersecting the rotation axis 101, the transmission member 113a is arranged between the spool 112 and the head housing 111 along the direction of the straight line 102. The motor shaft 122a and the spool 112 are configured to rotate synchronously. The transmission member 113a is provided with a transmission hole through which the spool 112 is sleeved and can rotate synchronously with the spool 112. In this way, when the motor shaft 122a drives the spool 112 to rotate, the transmission member 113a can rotate with the spool 112 synchronously. In fact, a limiting portion 112b is formed or coupled connected to with the spool 112, and the limiting portion 112b can limit the circumferential displacement of the transmission member 113a around the direction of the rotation axis 101. Exemplarily, the limiting portion 112b is a pair of protrusions symmetrically arranged with respect to a symmetry plane passing through the straight line 102. The transmission member 113a can be limited to the limiting portion 112b when it is sleeved to the spool 112 in the direction of the rotation axis 101, and only radial displacement in the linear direction perpendicular to the rotation axis 101 can be produced. The transmission member 113a is asymmetrical with respect to the symmetry plane passing through the rotation axis 101 in terms of mass distribution. Optionally, a center of mass G of the transmission member 113a deviates from the symmetry plane. The center of mass G of the transmission member 113a deviates from the rotation axis 101, so that when the trimming head 11 is driven to rotate by the motor 122, the transmission member 113a is subjected to a centrifugal force that makes it to have a tendency to move from the first position to the second position. When rotating around the axis of rotation 101, a resistance against centrifugal force is applied to the transmission member 113a to prevent the transmission member from moving from the first position to the second position. A biasing element 113b is also provided between the transmission member 113a and the spool 112, and the biasing element 113b can be a coil spring.

Optionally, a receiving groove 112c is formed and extending on the spool 112, and the coil spring is at least partially disposed in the receiving groove 112c. One end of the coil spring abuts against the bottom of the receiving groove 112c, and the other end abuts the transmission member 113a. The center of mass of the transmission member 113a and the coil spring are arranged on two sides of the rotation axis 101. In addition, the limiting portion 112b and the receiving groove 112c mate to form a sliding rail 117 for the transmission member 113a to slide. That is, the transmission member 113a also forms a slidable connection with the spool 112. When the transmission member 113a rotates with the spool 112, the transmission member 113a will generate a centrifugal force, and the transmission member 113a is also subjected to a biasing force of the biasing element 113b. The biasing force and the centrifugal force are in opposite direction. The centrifugal force and the biasing force can both be in the direction of the first straight line 102. The direction in which the transmission member 113a and the spool 112 constituting the sliding may also be along the direction of the straight line 102. The center of mass of the transmission member 113a and the biasing element 113b are respectively arranged on two sides of a plane passing through the rotation axis 101 and perpendicular to the first straight line 102. In some examples, when the transmission member 113a is on the movement in the direction of the first straight line 102 relative to the spool 112, it is also affected by a friction force between the transmission member 113a and the spool 112. The friction force can effectively prevent the biasing element 113b from overcoming the centrifugal force, and prevent the linkage device 113 from being overly flexible and causing the misfeeding of the line.

As shown in FIGS. 3 to 7, in the present example, the head housing 111 forms the accommodation space 114 mentioned above around the rotation axis 101, the spool 112 is at least partially disposed in the accommodation space 114 formed by the head housing 111, and the transmission member 113a is at least partially located in the accommodating space 11. Exemplarily, an upper bottom 111b is formed on the end of the head housing 111 near the motor 122 in the direction of the rotation axis 101. The upper bottom 111b does not enclose the accommodating space 114, and the accommodating space 114 is partially opened upward, so that the motor shaft 122a passes through the upper bottom 111b and extends into the accommodation space 114, and the transmission member 113a partially protrudes out of the head housing 111. The head housing 111 also form a mating portion 111c that can be driven by the transmission member 1113a, and the transmission member 113a is formed with a driving portion 113c that mates with the mating portion 111c. When the driving portion 113c is mated with the mating portion 111c, a force can be transmitted between the transmission member 113a and the head housing. Optionally, the mating portion 111c includes a mating surface 111d and a return surface 111e, wherein the mating surface 111d is used to contact the driving portion 113c to apply a reacting force to the driving portion 113c; and the return surface 111e is used to contact the driving portion 113c. When the driving portion 113c mates with the mating surface 111d, the trimming head 11 is in the working state; when the driving portion 113c is mated with the return surface 111e, the trimming head 11 is in an autonomous line-feeding state.

Figure 8:
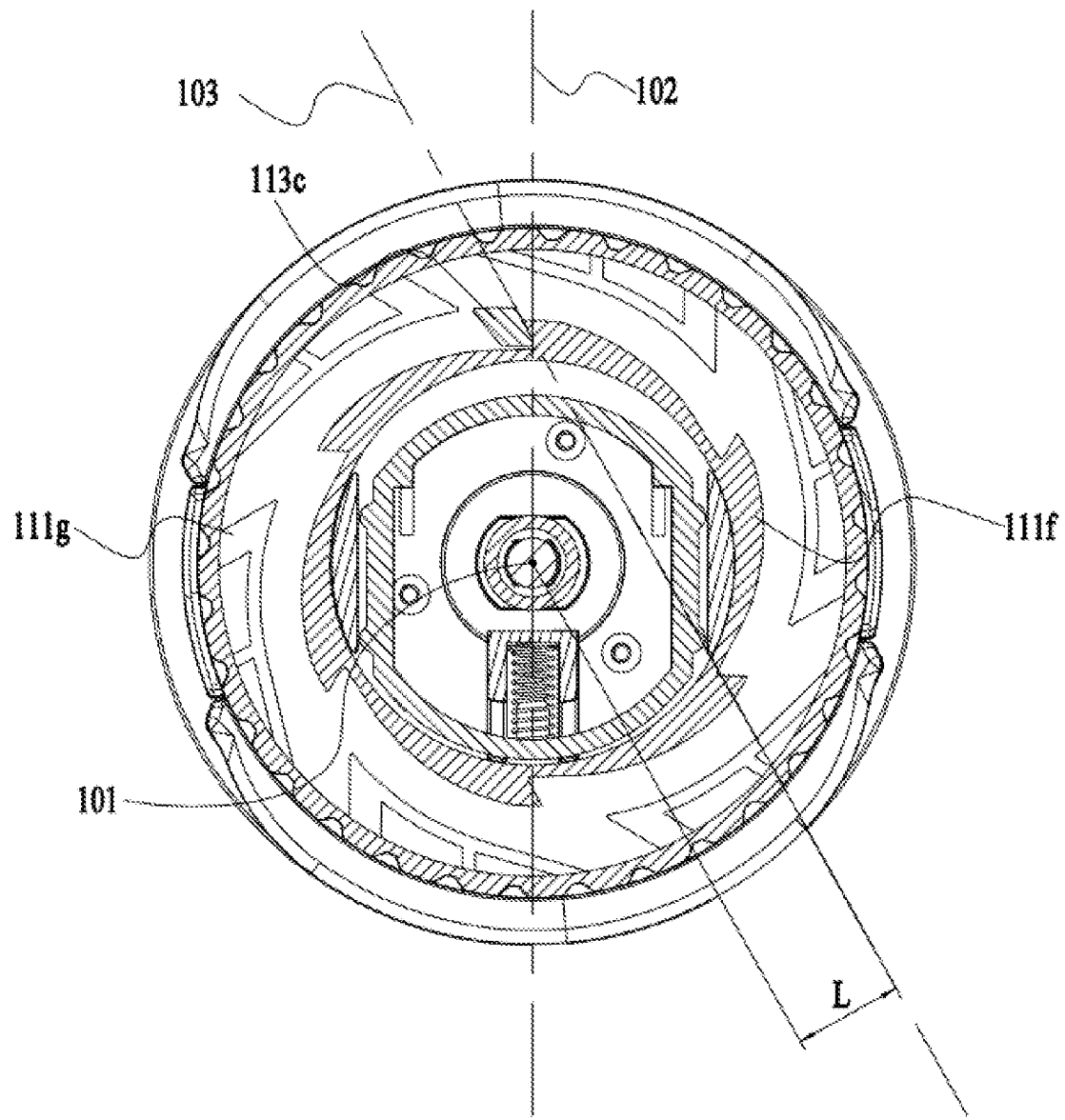
FIG. 8 is a section view of the head housing, the spool and the transmission part of the string trimmer of FIG. 3.
Figure 9:
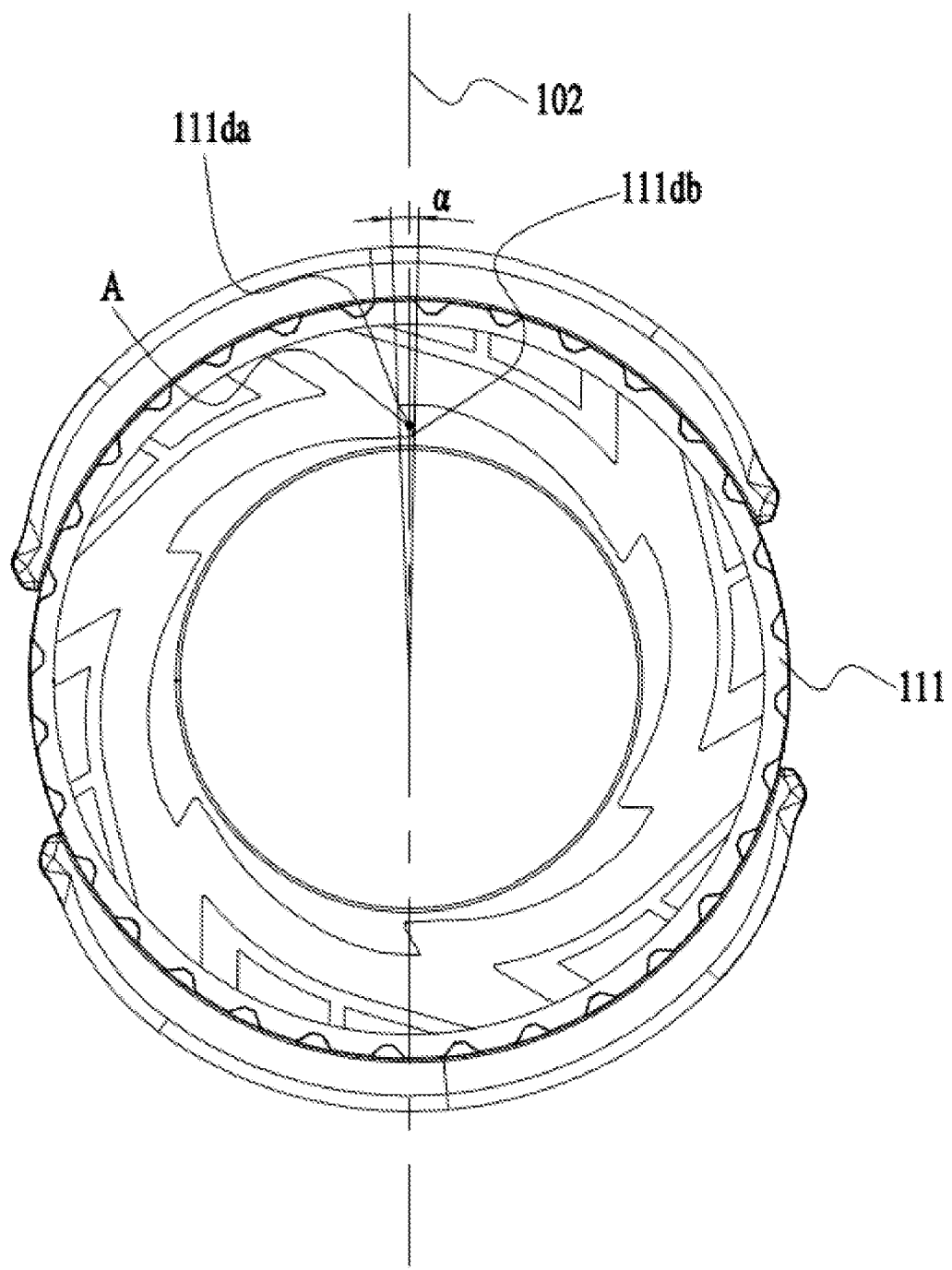
FIG. 9 is a top view of the head housing of the string trimmer of FIG. 3.
Figure 10:
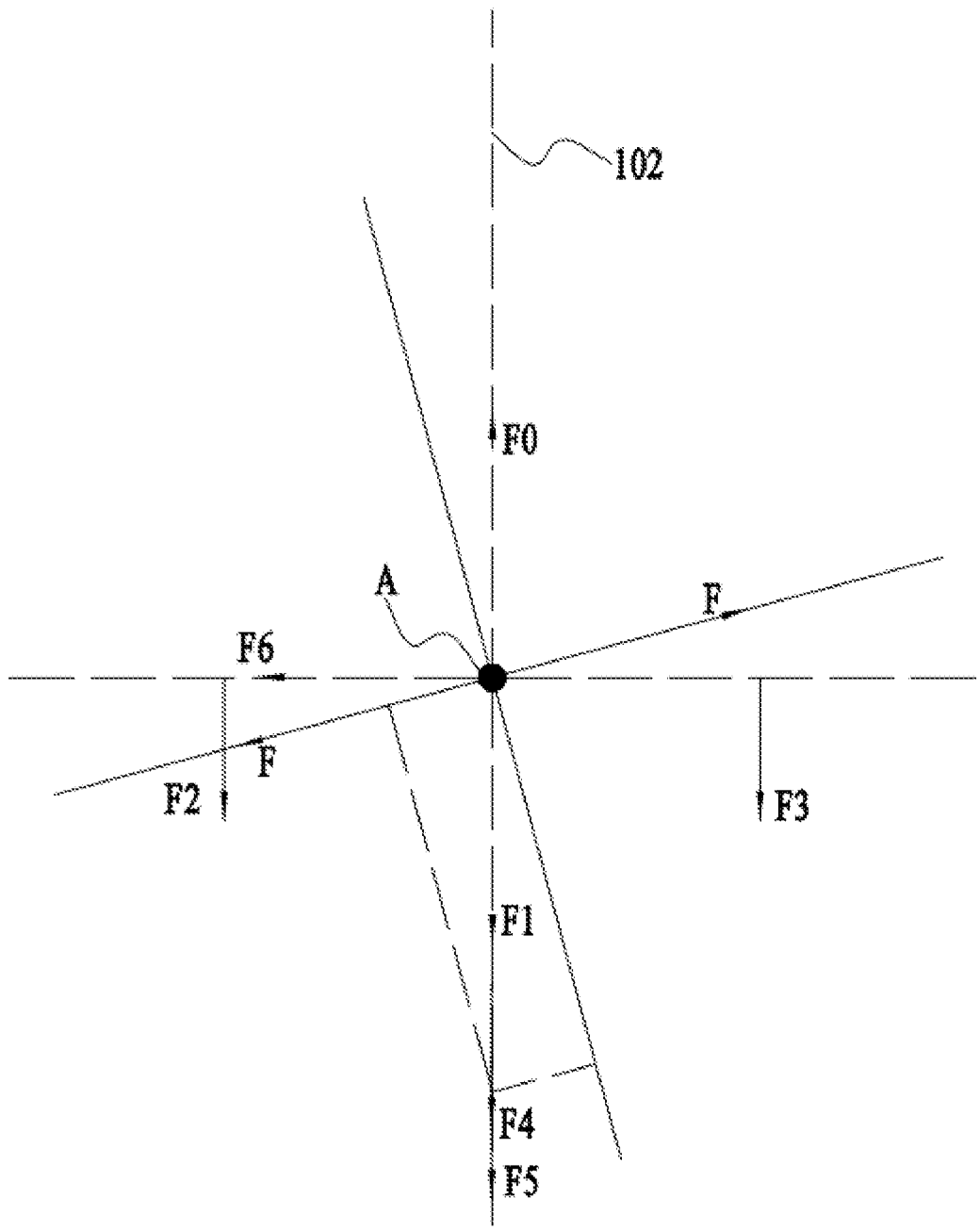
FIG. 10 is a force analysis diagram for any point on a first teeth of the working head of the string trimmer of FIG. 8.

As shown in FIGS. 8 to 10, an inner ring and an outer ring are formed in the direction where the upper bottom 111b extends toward the motor 122. Both the inner ring and the outer ring are formed around the rotation axis 101. The inner ring is formed with first teeth 111f, and the first teeth 111f are external teeth formed on the inner ring and protruding toward the outer ring. The outer ring is formed with second teeth 111g, and the second teeth 111g are internal tooth formed on the outer ring and protruding toward the inner ring. Wherein, the first teeth 111f constitutes or forms the above mating surface 111d, and the second teeth 111g constitutes or forms the above return surface 111e. Wherein the number of the first teeth 111f is multiple, and the number of the second teeth 111g is also multiple. In the circumferential direction around the rotation axis 101, the first teeth 111f and the second teeth 111g are staggered from each other. That is, the first teeth 111f and the second teeth 111g are not arranged in a diameter direction perpendicular to the rotation axis 101 at the same time. The transmission member 113a is formed with a driving portion 113c that can mate with first teeth 111f or second teeth 111g. The driving portion 113c on the transmission member 113a can be configured as an engaging tooth that mates with the first teeth 111f and the second teeth 111g. In this example, the driving portion 113c and the biasing element 113b are arranged on two sides of the transmission member 113a respectively. That is, the center of mass of the driving portion 113c and the transmission member 113a are arranged on the same side of the rotation axis 101.

Figure 12:
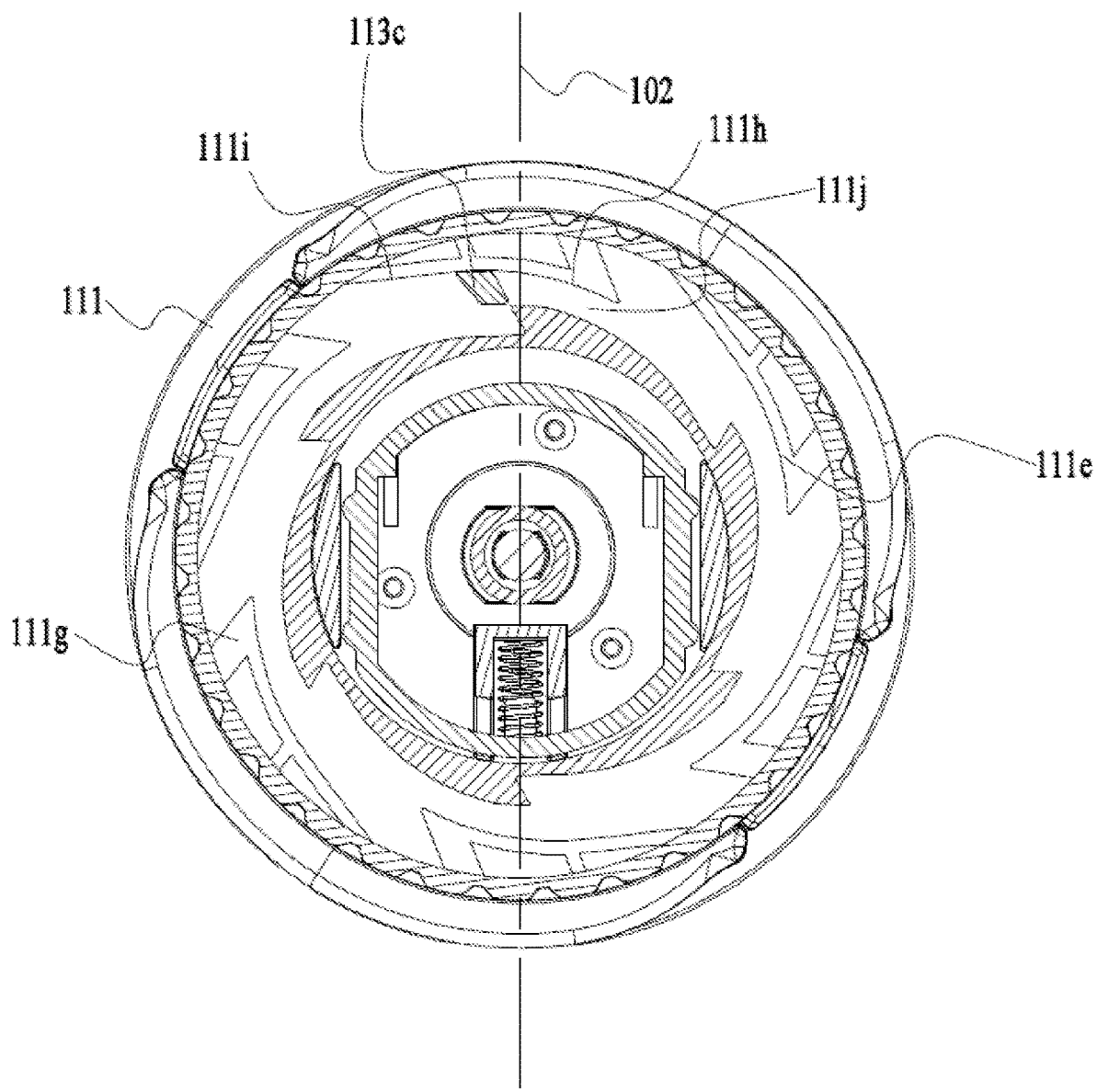
FIG. 12 is a section view of the trimming head, the spool and the transmission part of the string trimmer of FIG. 3 when the transmission part is pushed back by the second inner tooth.

As shown in FIG. 12, when the driving portion 113c of the transmission member 113a is engaged with the plurality of first teeth 111f or the plurality of second teeth 111g and the motor shaft 122a rotates in the first rotation direction, that is, when the motor shaft 122a rotates clockwise, the transmission member 113a makes the head housing 111 to be relative static to the spool 112, that is, there is no relative movement between the spool 112 and the head housing 111 at this time. It can be considered that the linkage device 113 is in the first equilibrium state at this time, and the string trimmer 100 is in the working state of normal grass trimming. As shown in FIG. 12, when the driving portion 113c of the transmission member 113a is separated from the first teeth 111f and the second teeth 111g, the whole composed of the transmission member 113a and the spool 112 can move relative to the head housing 111. In this example, the direction of the movement of the spool 112 relative to the head housing 111 is consistent with the direction in which the string trimmer 100 trims grass. That is, the direction of the movement of the spool 112 relative to the head housing 111 is clockwise, that is, the spool 112 can now produce a relative movement relative to the head housing 111, it can be considered that the linkage device 113 at this time is in the second equilibrium state, that is, the cutting head 11 is in the autonomously line-feeding state.

In this example, a damping device 17 is also provided, and the damping device 17 has a damping spool 112 or head housing 111 to rotate and enables the elative rotation between the spool 112 and the head housing 111. Exemplarily, the damping device 17 may be set as a limiting pin for restricting the rotation of the head housing 111 or the spool 112, which can be inserted into a limiting hole reserved on the head housing 111 or the spool 112 to limit the rotation of the head housing 111 or the spool 112. As another implementation, the damping device 17 can also be configured as a friction element which can contact the spool 112 or the head housing 111, so that a relative motion between the head housing 111 and the spool 112 is caused by the speed difference. As another implementation, the damping device 17 can also be configured to include a one-way bearing 171 and a rotating support 172; wherein the one-way bearing 171 can make the two parts or parts connected to it rotate relatively only in one rotation direction, but cannot rotate relatively in another rotation direction. The function of the rotating support 172 is to rotatably connect a portion of the cutting head 11 and form a support for its rotation. The rotating support can be the first housing 121 of the string trimmer 100 that houses the motor 122, and it can also be other components fixedly coupled with the housing 121, such as the guard 16. Optionally, the one-way bearing 171 is arranged between the rotating support 172 and the head housing 111 so that they can form a one-way rotating connection. That is, when the rotating support 172 is used as a reference substance, the head housing 111 can rotate in one of the rotation directions, but cannot rotate in another direction. The motor shaft 122a is connected to the spool 112 in a non-rotational manner so that the spool 112 can rotate in both directions relative to the rotating support. That is, when the rotating support 172 is used as the reference substance, the spool 112 can rotate forward and reverse.

Based on the above hardware, when the motor 122 rotates forward, the motor shaft 122a drives the spool 112 to rotate clockwise. At this time, the transmission member arranged on the spool 112 engages with the first teeth 111f to achieve torque transmission, and at the same time, a one-way circumferential drive is set to make the head housing 111 rotate relative to the supporting member 172 (that is relative to the entire string trimmer 100) and be able to rotate forward. Then, at this time, the spool 112 and the head housing 111 rotate synchronously, and the string trimmer 100 can execute the trimming mode. When the motor 122 rotates reversely, the motor shaft 122a drives the spool 112 to reverse. The head housing 111 make the spool 112 and the head housing 111 to move relative to each other because the one-way bearing 171 prevents the head housing 111 from reversing. At this time, the driving portion 113c on the transmission member is disengaged from the first teeth 111f due to the reverse rotation of the motor 122, so that the string trimmer 100 can perform an autonomous line-feeding mode.

Exemplarily, as shown in FIGS. 8 to 9, the tooth surface of the first teeth 111f obliquely intersects the straight line 102 and forms a preset angle. The first teeth 111f incline toward the first rotation direction. In some examples, the angle between the tooth surface of the first teeth 111f and the straight line 102 is greater than 0° and less than or equal to 45°. During the grass trimming process of the string trimmer 100, the trimming head 11 always keeps rotating at a constant speed. When the transmission member 113a rotates with the spool 112 at the constant speed, there will be an interaction force F between the driving portion 113c and the mating surface 111d of the head housing 111. Exemplarily, the force F is distributed along a direction perpendicular to mating surface 111d. In this example, the mating surface 111d extends in a first plane 103, and the first plane 103 is substantially parallel to the rotation axis 101. There is a preset minimum distance L between the rotation axis 101 and the first plane 103, and the distance L is greater than zero. With this arrangement, the aforementioned interaction force F can be generated between the mating surface 111d and the driving portion 1113. When the lowest distance between the rotation axis and the first plane 103 is greater than 0 and less than or equal to 20 mm, the above-mentioned interaction force F will have better effect.

In addition, the mating surface 111d is not limited to the tooth surface which is smooth and continuous formed on the first teeth 111f in this example. The mating surface 111d can exist in any form as long as it can provide a force acting on the driving portion 113c. In fact, the mating surface 111d includes an effective surface capable of providing a reaction force with the driving portion 113c, and the effective surface has a projection line in a plane perpendicular to the rotation axis. The projection line includes a first extreme position 111da and a second extreme position 111db that can generate an interaction force with the driving portion 113c. Here, it is defined that the effective acting surface is located between the first extreme position 111da and the second extreme position 111db, and the part beyond the first extreme position 111da and the second extreme position 111db cannot produce a reaction force with the driving portion 113c. In fact, there may also be a section between the first extreme position 111da and the second extreme position 111db that cannot generate a reaction force with the driving portion 113c. The section between the extreme position 111db and the section where the reaction force can be generated between the driving portion 113c is defined as the effective action surface. In this example, a central angle α is formed between the first extreme position 111da and the second extreme position 111db and the axis of the rotation axis, and the center angle α is greater than 0° and less than or equal to 45°. Within the range of the central angle α, the reaction force can be effectively generated between the mating surface 111d and the driving portion 113c. When the aforementioned central angle α is greater than or equal to 3° and less than or equal to 40°, the effect of the reaction force generated between the mating surface 111d and the driving portion 113c is better.

However, during the rotation of the trimming head 11, due to the change in the length of the trimming line 15, the torque outputted by the trimming head 11 also changes accordingly. Exemplarily, the longer the trimming line 15 is, the greater the torque outputted by the trimming head 11 will be, and the greater the interaction force between the transmission member 113a and the head housing 111 will be. On the contrary, the shorter the trimming line 15 is, the smaller the torque outputted by the head 11 will be, and the smaller the interaction force between the transmission member 113a and the head housing 111 will be.

Figure 11:
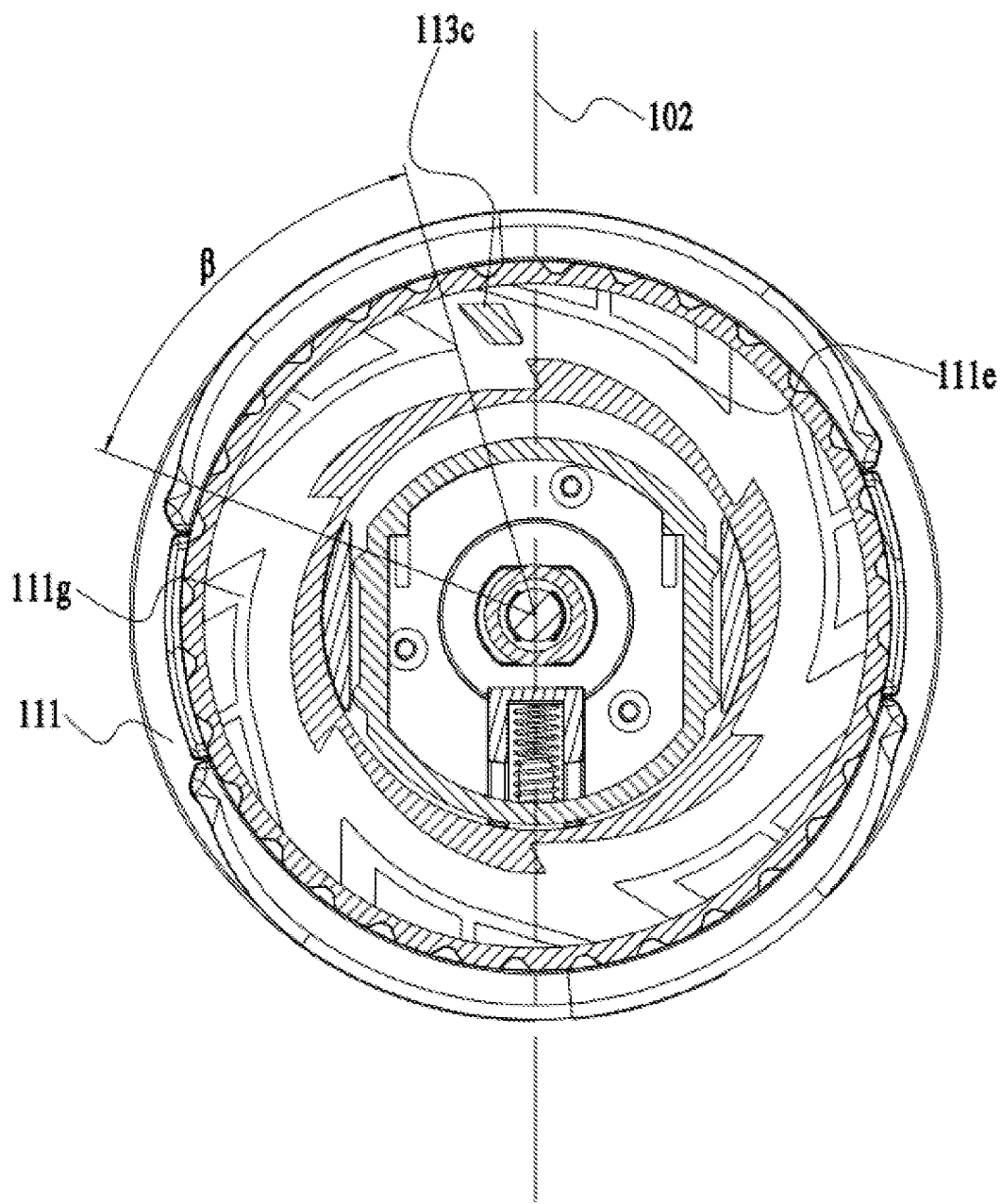
FIG. 11 is a section view of the working head, the spool and the transmission part of the string trimmer of FIG. 3 when the transmission part is between a first inner tooth and a second inner tooth.

Here, any point on the mating surface 111d can be used for force analysis. As shown in FIG. 11, the interaction force F between the first teeth 111f of the head housing 111 and the driving portion 113c of the transmission member 113a is distributed along a direction of the tooth surface perpendicular to the mating surface 111d, which can be decomposed into a first component force in the direction of the straight line 102 and a second component force F1 in the direction of the straight line 102, wherein the direction of the second component force F1 is opposite to the direction of the centrifugal force F0. In addition, a friction is generated between the transmission member 113a and the spool 112 due to the centrifugal force F0, and the friction is actually generated when the transmission member 113a slides in the sliding rail 117 formed by the limiting portion 112b and the receiving groove 112c. Since the sliding rail 117 is distributed symmetrically with respect to a plane passing through the straight line 102 and the rotation axis 101 at the same time, that is, in the direction of a straight line perpendicular to the rotation axis 101, the transmission member 113a and the limiting portion 112b include at least two contact surfaces 115 (see FIGS. 6 and 7). Therefore, the friction force includes F2 and F3, and F2 and F3 form a resultant force F4 distributed along the direction of the straight line 102. In addition, the biasing force between the transmission member 113a and the biasing element 113b can be defined as F5, and exemplarily, F1, F4, F5 are all distributed along the direction of the straight line 102 and deviate from the centrifugal force F0. In this example, F0 is only related to the mass of the transmission member 113a, the angular velocity of the trimming head 11 and the radius of the spool 112. That is, when the aforementioned parameters are all fixed values, F0 is a constant. F5 is the biasing force between the transmission member 113a and the biasing element 113b. When the elastic coefficient of the biasing element 113b is determined, F5 is also a constant. Therefore, during the rotation of the cutting head 11, when the load of the trimming head 11 changes due to the change in the length of the trimming line 15, only F changes, that is, F1 changes. F4 is a sliding friction force between transmission member 113a and the spool 112. When the material and contacting area of the transmission member 113a and the spool 112 are determined, F4 changes synchronously with F1. Therefore, when the trimming line 15 is greater than a preset length, the torque of the trimming head 11 is relative large at this time, resulting in a large F1, so that F0<F1+F4+F5, that is, the centrifugal force at this time is less than the summation of F1, F4 and F5. The transmission member 113a cannot be separated from the first teeth 111f under the action of centrifugal force, and the entire trimming head 11 is in the first equilibrium state. When the trimming line 15 is less than a preset length, the torque of the trimming head 11 is smaller at this time, resulting in a smaller F1, so that F0>F1+F4+F5, that is, the centrifugal force at this time is greater than the summation of F1, F4 and F5. The transmission member 113a is separated from the first teeth 111f under the action of centrifugal force, and the entire trimming head 11 is in the second equilibrium state. At this time, the spool 112 can rotate relative to the head housing 111, and the trimming head 11 starts to feed the trimming line.

In one example, the angle between the tooth surface of the mating surface 111d and the direction of the straight line 102 is 18°. When the length of the effective portion of the trimming line 15 is greater than a preset value, the torque at the output end of the motor is 0.505 N·m. At this time, the mechanics calculation is carried out according to the principle of force reaction:

$$T=F*R \quad (1)$$

Where T represents the torque at the output end of the motor, F represents the interaction force between the spool 112 and the transmission member 113a on a tooth surface perpendicular to the first teeth 111f, and R represents a force radius of an action point on the tooth surface.

It is deduced that when the length of the effective portion of the trimming line 15 is greater than the preset value, the force of the transmission member 113a is as follows:

$$F=T/R=0.505/37.5*1000=13.47N \quad (2)$$

$$F1=F*\sin 18=13.47*\sin 18=4.16N \quad (3)$$

$$F4=F*k=13.47*0.25=3.37N \quad (4)$$

$$F5=3N \quad (5)$$

$$F0=mw\char`\^2*r=0.0167*607.37*607.37*0.0014=8.62N. \quad (6)$$

It can be concluded that when the length of the effective portion of the trimming line 15 is greater than the preset value, the relationship between the centrifugal force received by the transmission member 113a and other resultant forces is 8.62<4.16+3.37+3=10.53 and F0<F1+F4+F5.

Therefore, at this time, the centrifugal force received by the transmission member 113a is smaller than the resultant force which driving the transmission member 113a toward the driving portion 113c to engage with the first teeth 111f on the head housing 111, and the transmission member 113a keeps engaging with the head housing 111 when receiving the resultant force of all the forces.

When the effective portion of the trimming line 15 is worn and shortened by 40 mm, the torque at the output end of the motor is 0.265 N·m. At this time, it is deduced that when the length of the effective portion of the trimming line 15 is worn to less than the preset value, the force of the transmission member is as follows:

$$F=T/R=0.24/37.5*1000=7.07N \quad (7)$$

$$F1=F*\sin 18=7.07*\sin 18=2.18N \quad (8)$$

$$F4=F*k=7.07*0.25=1.77N \quad (9)$$

$$F5=3N \quad (10)$$

$$F0=mw\char`\^2*r=0.0167*607.37*607.37*0.0014=8.62N \quad (11)$$

It can be concluded that when the length of the effective portion of the trimming line 15 is less than the preset value, the relationship between the centrifugal force received by the transmission member 113a and other resultant forces is 8.62>2.18+1.77+3=6.95 and F0>F1+F4+F5.

Therefore, at this time, the centrifugal force received by the transmission member 113a is greater than the resultant force of the engagement between the driving portion 113c which drives the transmission member 113a and the first teeth 111f on the head housing 111. Therefore, the transmission member 113a is under the resultant force of all the forces received and moves along the direction of the straight line to separate from the head housing 111, so that the transmission member 113a allows the head housing 111 and the spool 112 to rotate relative to each other at this time, and then the trimming line 15 can be released at this time.

The mechanical calculation process shown above is only to facilitate the understanding of the force relationship between the spool 112, the head housing 111 and the transmission member 113a when the trimming head 11 is in the first equilibrium state and the string trimmer 11 rotates is at a constant speed. During use, the above data will have a preset deviation, which does not limit the protection scope of the present disclosure in other examples.

Figure 13:
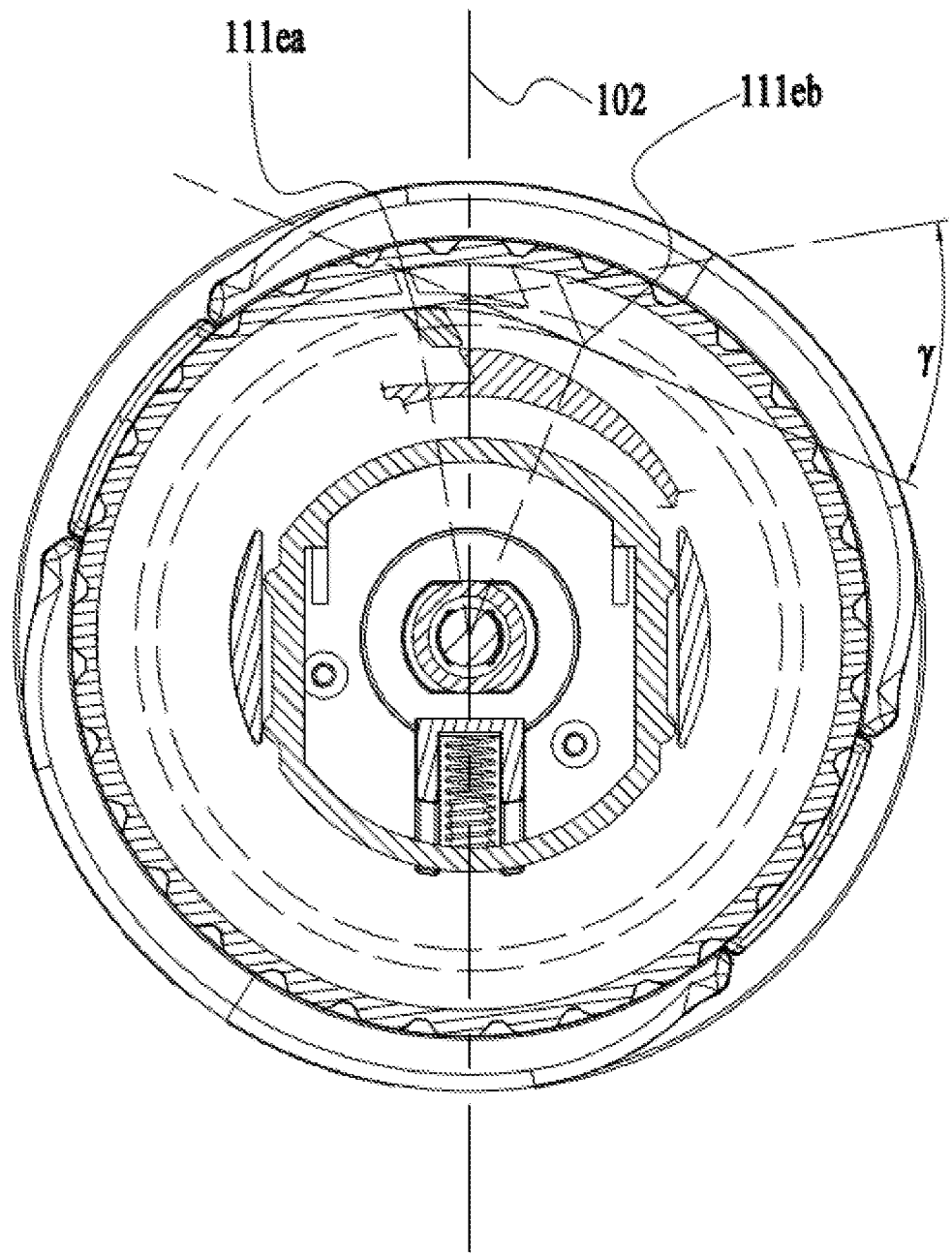
FIG. 13 is a section view of the head housing, the spool and the transmission member of the string trimmer in FIG. 12 when the transmission member is pushed back by the second teeth; and in the view, part of the first teeth and the plurality of second teeth are deleted.

As shown in FIGS. 12 to 13, when the trimming head 11 is in the second equilibrium state, the transmission member 113a is not constrained by the first teeth 111f and the second teeth 111g, and can continue to follow the direction of the straight line 102 under the action of centrifugal force and move toward the second teeth 111g. When the driving portion 113c of the transmission member 113a moves to the second teeth 111g of the head housing 111, the driving portion 113c starts to contact the return surface 111e. During the relative rotation of the return surface 111e between the head housing 111 and the spool 112, the transmission member 113a can be pushed to move along the straight line 102 toward the first teeth 111f, and finally engaged with the first teeth 111f, so as to complete a line-feeding and enter the next autonomously identification. In this example, the second teeth 111d are not uniformly distributed in the circumferential direction around the rotation axis 101, and they have gradual arc on the tooth surfaces facing the direction of the rotation axis 101. The protrusions 111e have a substantially continuous smooth surface to continuously push the transmission member 113a back to the first teeth 111f and engage with the first teeth 111f. In fact, as an implementation, in a plane perpendicular to the rotation axis 101, the central angle β formed by the line connecting a tooth tip or a tooth bottom of the second teeth 111g together with the rotation axis 101 respectively is greater than or equal to 30° and less than or equal to 50°. The tooth surface of the second teeth 111g close to the rotation axis 101 also includes a first section 111i and a second section 111j. Wherein, when the driving portion 113c of the transmission member 113a is located in the area where the first section 111i is located, the first section 111i does not generate the driving force on the transmission member 113a. When the transmission member 113a is separated from the first teeth 111f, since the head housing 111 is not driven at this time, the head housing 111 is in a stalled state, so that it rotates relative to the spool 112. At this time, the driving portion 113c quickly moves to the second section 111j and contacts the second section 111j. During this process, the trimming line 15 is continuously released, and the return surface 111e continuously pushes the driving portion 113c to reset back to the first teeth 111f. Exemplarily, in order for that the return surface 111e can push the driving portion 113c to reset to the first teeth, the return surface 111e has a projection line in a plane perpendicular to the rotation axis 101, and the return surface 111e is configured to include a first extreme position 111ea and a second extreme position 111eb within the area of the projection line, and the first extreme position 111ea and the second extreme position 111eb can push the transmission member 113a to return to the mating surface. The return surface 111e is also configured to include a first circumference centered on the axis of the rotation axis 101 and passing through the first extreme position 111ea, and a second circumference centered on the axis of the rotation axis 101 and passing through the second extreme position 111eb. A angle γ formed by the tangent line of the first circumference at the first extreme position 111ea and the tangent line of the second circumference at the second extreme position 111eb is greater than or equal to 15°. In fact, when the driving portion 113c is in contact with the return surface 111e, when the driving portion 113c is in the first extreme position 111ea, at this time, the head housing 111 has just entered the stall state, and there is still a small speed difference between the driving portion 113c and the spool 112. When the driving portion 113c is in contact with the return surface 111e, the return surface 111e has a first interaction force to push the driving portion 113c to reset back to original place. As the relative rotation between the head housing 111 and the spool 112 continues, the driving portion 113c and the direct contact of the return surface 111e is closer. At the same time, the relative speed between the head housing 111 and the spool 112 gradually increases, and the force between the return surface 111e and the driving portion 113c gradually increases until the driving portion 113c is in the second position. At the second extreme position 111eb, the return surface 111e pushes the transmission member 113a to completely recover. At this time, the return surface 111e has a second interaction force that pushes the driving portion 113c to recover, wherein the first interaction force is smaller than or equal to the second interaction force. Here, in order to enable the transmission member to be pushed and reset to the first teeth, the aforementioned angle γ is configured to be greater than or equal to 15°, so that the return surface has an effective length that can push the transmission member to the first position. Exemplarily, when the angle γ is configured to be greater than or equal to 20°, the return surface 111e can be more reliably to push the transmission member 113a to the first position, and at this time, the line-feeding effect of the trimming head 11 is better. In one example, if the return surface 111e pushes the transmission member 113a to the first position quickly, the trimming line 15 may not be released in time and effectively.

In fact, the second section and the tooth surface of the first teeth 111f away from the rotation axis 101 forms a guiding channel 111h. The guiding channel can guide the driving portion 113c to reset to the first position, that is, the position of the engagement of the driving portion 113c and the first teeth 111f. Exemplarily, due to the existence of the return surface 111e and the continuous extension of the return surface 111e, the driving portion 1113c will never engage with the second teeth 111g. Thus, it is ensured that the length in every release cycle of the trimming line 15 is limited to a small range, so as to avoid the excessive release of the trimming line 15 which can lead to increase of the load of the motor 122 or avoid the trimming line 15 from breaking the guard 16 due to the excessively long length of the trimming line 15 being released.

In fact, when turning on the tool, when the trimming head 11 accelerates from a static state to a constant speed state, if the trimming line 15 is greater than a preset length, the trimming line 15 will not be released due to the speed change; if the trimming line 15 is less than a preset length, the trimming line 15 will be released to a length greater than the preset length as the speed changes. In one example, the release of the trimming line 15 is not related to the speed change. It is only because the trimming line 15 is relatively short and the torque at the output end of the motor is relatively small, so that the trimming line 15 is released.

What is claimed is:

1. A string trimmer, comprising:
   a trimming head comprising:
   a spool for winding a trimming line, the spool comprising an outer surface having a limiting portion extending upwards from the outer surface, the limiting portion defining a channel;
   a head housing defining an accommodating space for at least partially accommodating the spool, the head housing comprising an outer housing surface defining an aperture though which the limiting portion extends, a circumference of the aperture including a plurality of mating portions extending from the outer housing surface, the plurality of mating portions including a driving portion having an inclined surface and a plane defined by the inclined surface;
   a transmission member slidably coupled to the spool within the channel, the transmission member comprising the driving portion, the transmission member having a first position where the driving portion mates with at least one of the plurality of mating portions of the head housing to prevent relative rotation between the spool and the head housing and a second position where the driving portion does not mate with at least one of the plurality of mating portions of the head housing to allow relative rotation between the spool and the head housing;

a biasing element for biasing the transmission member towards the first position; and a driving device comprising a motor for driving the trimming head to rotate around a rotation axis, and the plane defined by the inclined surface does not pass through the rotation axis, wherein when the transmission member is in the first position, the trimming head is in a working state and the transmission member rotates around the rotation axis synchronously with the spool, and when the transmission member is in the second position, the trimming head is in a autonomous line-feeding state and relative rotation is generated between the spool and the head housing to feed the trimming line, and when the trimming head is driven to rotate by the motor, the transmission member is subjected to a centrifugal force which cause a moving tendency in a direction from the first position to the second position, when the head housing rotates around the rotation axis, friction generated between the transmission member and the limiting portion applies a resistance to the transmission member against the centrifugal force to prevent the transmission member from moving from the first position to the second position, and when the trimming head is in a trimming state and a length of an effective portion of the trimming line extending beyond the head housing is less than a preset value, the resistance applied by the head housing to the transmission member is reduced so that the transmission member moves from the first position to the second position under the centrifugal force.

2. The string trimmer according to claim 1, wherein, when the length of the effective portion of the trimming line is greater than the preset value, the transmission member is in the first position and, when the length of the effective portion of the trimming line is less than the preset value, the transmission member is in the second position.

3. The string trimmer according to claim 1, wherein the limiting portion is defined by two upstanding walls symmetrically arranged with respect to the rotation axis, the limiting portion is formed with a sliding rail for the transmission member to slide, and the limiting portion comprises a contact surface in a straight line perpendicular to the rotation axis.

4. The string trimmer according to claim 1, wherein the spool further comprises a receiving groove, the biasing element is arranged in the receiving groove, a first end of the biasing element abuts against the receiving groove, and a second end of the biasing element abuts against the transmission member.

5. The string trimmer according to claim 1, wherein the trimming head further comprises an automatic winding state, when the trimming head is in the automatic winding state, the motor drives the spool to rotate relative to the head housing in a second rotation direction so that the trimming line is wound to the spool and, when the trimming head is in the autonomous line-feeding state, the transmission member moves to the second position and the spool rotates relative to the head housing along a first rotating direction to release the trimming line.

6. The string trimmer according to claim 1, wherein the string trimmer further comprises a damping device for damping at least one of the spool or the head housing to make the string trimmer in an automatic winding state.

7. The string trimmer according to claim 1, wherein the plane defined by the inclined surface is parallel to the rotation axis, and a distance between the rotation axis and the plane is greater than zero.

8. The string trimmer according to claim 1, wherein a distance between the rotation axis and the plane defined by the inclined surface is greater than 0 mm and less than or equal to 20 mm.

9. The string trimmer according to claim 7, wherein the inclined surface is capable of applying a reaction force, the inclined surface has a projection line in the plane defined by the inclined surface and perpendicular to the rotation axis, the projection line comprises a first extreme position and a second extreme position, and a central angle between a connecting line between the first extreme position and the rotation axis and the connecting line between the second extreme position and the rotation axis is greater than 0° and less than or equal to 45°.

10. The string trimmer according to claim 9, wherein the string trimmer further comprises a first circumference centered on the rotation axis and passing through the first extreme position and a second circumference centered on the rotation axis and passing through the second extreme position, an angle $\gamma$ formed by a tangent line of the first circumference at a first extreme position, and a tangent line of the second circumference at the second extreme position is less than or equal to 45°.

11. The string trimmer according to claim 1, wherein, when the transmission member is in the first position, the trimming head is in the trimming state and the motor has a first rotation speed and, when the transmission member is in the second position, the trimming head is in the autonomous line-feeding state, the motor has a second rotation speed, a ratio of an absolute value of a difference between the first rotation speed and the second rotation speed to the first rotation speed is greater than or equal to 0 and less than or equal to 0.1, and the relative rotation is generated between the spool and the head housing to feed the trimming line.

12. A trimming head, used for a string trimmer, capable of being driven to rotate around a rotation axis to achieve grass trimming, comprising:

a spool for winding a trimming line the spool comprising an outer spool surface having a limiting portion extending upwards from the outer spool surface, the limiting portion defining a channel;

a head housing forming an accommodating space for at least partially accommodating the spool, the head housing comprising an outer head housing surface defining an aperture though which the limiting portion of the spool extends, a circumference of the aperture including a plurality of mating portions extending from the outer head housing surface, the plurality of mating portions including a driving portion having an inclined surface and a plane defined by the inclined surface; and a transmission member slidably coupled to the spool within the channel, the transmission member having a first position where the driving portion mates with at least one of the plurality of mating portions of the head housing to prevent relative rotation between the spool and the head housing and a second position where the driving portion does not mate with at least one of the plurality of mating portions of the head housing to allow relative rotation between the spool and the head housing;

wherein the transmission member rotates around the rotation axis synchronously with the spool and the trimming head is in a trimming state when the transmission member is in the first position, the rotation is generated between the spool and the head housing to feed the trimming line when the transmission member is in the second position, a center of gravity of the transmission member deviates from the rotation axis, when the trimming head is rotating, the transmission member is subjected to a centrifugal force which cause a moving tendency in a direction from the first position to the second position, when the head housing rotates around the rotation axis, the head housing also applies a resistance to the transmission member against the centrifugal force to prevent the transmission member from moving from the first position to the second position, and when the trimming head is in the trimming state and a length of an effective portion of the trimming line extending beyond the head housing is less than a preset value, the resistance applied by the head housing to the transmission member is reduced so that the transmission member moves from the first position to the second position under the centrifugal force.

13. The string trimmer according to claim 12, wherein the transmission member comprises the driving portion for driving the head housing to rotate synchronously with the spool, the head housing is formed with a mating portion for mating with the driving portion, the mating portion comprises first teeth distributed around the rotation axis, the head housing is formed with or connected with second teeth for resetting the transmission member, the first teeth and the second teeth are staggered around the rotation axis, in a circumferential range around the rotation axis, each of the second teeth has a tooth surface distributed toward the rotation axis, and the tooth surface has a return surface facing the rotation axis and the return surface is gradually changing.

14. A trimming head, used for string trimmer, capable of being driven to rotate around a rotation axis to achieve grass trimming, comprising:

a spool for winding a trimming line the spool comprising an outer surface having a limiting portion extending upwards from the outer surface, the limiting portion defining a channel;

a head housing formed with an accommodating space for at least partially accommodating the spool the head housing comprising an outer housing surface defining an aperture though which the limiting portion extends, a circumference of the aperture including a plurality of mating portions extending from the outer housing surface, the plurality of mating portions including a driving portion having an inclined surface and a plane defined by the inclined surface; and a transmission member slidably mounted to the spool within the channel, the transmission member comprising the driving portion, the transmission member having a first position where the driving portion mates with at least one of the plurality of mating portions of the head housing to prevent relative rotation between the spool and the head housing and a second position where the driving portion does not mate with at least one of the plurality of mating portions of the head housing to allow relative rotation between the spool and the head housing;

wherein the transmission member drives the head housing to rotate synchronously with the spool, the head housing is formed with a mating portion to mate with the driving portion, the mating portion is formed with a mating surface for contacting with the driving portion to apply a reacting force to the driving portion, the mating surface extends in a first plane, the first plane is parallel to the rotation axis, and a distance between the rotation axis and the first plane is greater than zero.

15. The trimming head according to claim 14, wherein the distance between the rotation axis and the first plane is greater than 0 and less than or equal to 20 mm.

16. The trimming head according to claim 14, wherein the inclined surface is capable of applying a reaction force, the inclined surface having a projection line in a plane perpendicular to the rotation axis, the projection line comprises a first extreme position and a second extreme position, and a central angle between a connecting line between the first extreme position and the rotation axis and the connecting line between the second extreme position and the rotation axis is greater than 0° and less than or equal to 45°.

* * * * *